United States Patent
Pandian et al.

(10) Patent No.: US 11,357,047 B2
(45) Date of Patent: Jun. 7, 2022

(54) ADAPTIVE DETECTION THRESHOLD FOR CONTENTION-BASED CHANNEL ACCESS

(71) Applicant: QUALCOMM Incorporated, San Diego, CA (US)

(72) Inventors: Mani Bharathi Pandian, Santa Clara, CA (US); Sandip Homchaudhuri, San Jose, CA (US); James Gardner, San Ramon, CA (US); Vincent Knowles Jones, IV, Redwood City, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 58 days.

(21) Appl. No.: 15/931,360

(22) Filed: May 13, 2020

(65) Prior Publication Data

US 2021/0360694 A1 Nov. 18, 2021

(51) Int. Cl.
| | |
|---|---|
| *H04W 74/08* | (2009.01) |
| *H04W 72/08* | (2009.01) |
| *H04W 24/02* | (2009.01) |
| *H04W 28/06* | (2009.01) |
| *H04L 1/00* | (2006.01) |
| *H04L 12/64* | (2006.01) |

(52) U.S. Cl.
CPC ....... *H04W 74/0816* (2013.01); *H04L 1/0026* (2013.01); *H04W 24/02* (2013.01); *H04W 28/065* (2013.01); *H04W 72/082* (2013.01); *H04L 2012/6448* (2013.01)

(58) Field of Classification Search
CPC .................. H04L 1/0023; H04L 1/0026; H04L 2012/6448; H04L 12/413; H04L 12/2866; H04L 5/0062; H04W 28/06; H04W 28/065; H04W 24/00; H04W 24/02; H04W 24/04; H04W 72/08; H04W 72/082; H04W 74/00; H04W 52/0225; H04W 52/0251; H04W 52/24; H04W 52/243
See application file for complete search history.

(56) References Cited

U.S. PATENT DOCUMENTS

| | | | | |
|---|---|---|---|---|
| 9,807,699 | B2 * | 10/2017 | Oteri | H04W 52/243 |
| 10,257,859 | B1 * | 4/2019 | Chu | H04W 74/0808 |
| 2005/0152313 | A1 * | 7/2005 | Cave | H04W 74/08 370/333 |
| 2005/0266803 | A1 * | 12/2005 | Dinur | H04B 1/1027 455/67.11 |
| 2005/0271133 | A1 * | 12/2005 | Waxman | H04W 48/16 375/227 |

(Continued)

*Primary Examiner* — Warner Wong
(74) *Attorney, Agent, or Firm* — Paradice and Li LLP

(57) ABSTRACT

This disclosure provides systems, methods and apparatuses for wireless communications. In some implementations, a first wireless communication device associated with a basic service set (BSS) receives a plurality of packets transmitted during a measurement window by a second wireless communication device associated with the BSS. The first wireless communication device determines a received signal strength indicator (RSSI) value of the plurality of received packets, determines a level of overlapping basic service set (OBSS) interference on the wireless medium during the measurement window, and adjusts one or more of a packet detect (PD) threshold, an OBSS PD threshold, or an energy detect (ED) threshold based on the determined RSSI value and the level of OBSS interference.

30 Claims, 15 Drawing Sheets

(56) References Cited

U.S. PATENT DOCUMENTS

| | | | |
|---|---|---|---|
| 2016/0112969 A1* | 4/2016 | Zhou | H04W 72/0473 |
| | | | 370/252 |
| 2016/0174079 A1* | 6/2016 | Wang | H04W 16/14 |
| | | | 455/454 |
| 2017/0070962 A1 | 3/2017 | Wang et al. | |
| 2017/0374682 A1* | 12/2017 | Jiang | H04W 74/0825 |
| 2018/0077654 A1* | 3/2018 | Kulkarni | H04W 84/12 |
| 2018/0324859 A1* | 11/2018 | Kim | H04W 74/0816 |
| 2019/0174435 A1* | 6/2019 | Tayamon | H04W 74/0808 |
| 2019/0313328 A1 | 10/2019 | Ma | |
| 2020/0288323 A1* | 9/2020 | Silverman | H04W 72/046 |

* cited by examiner

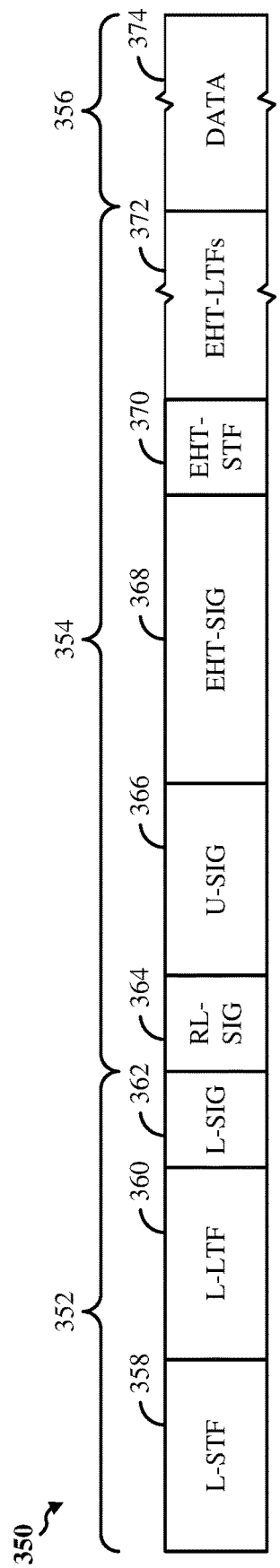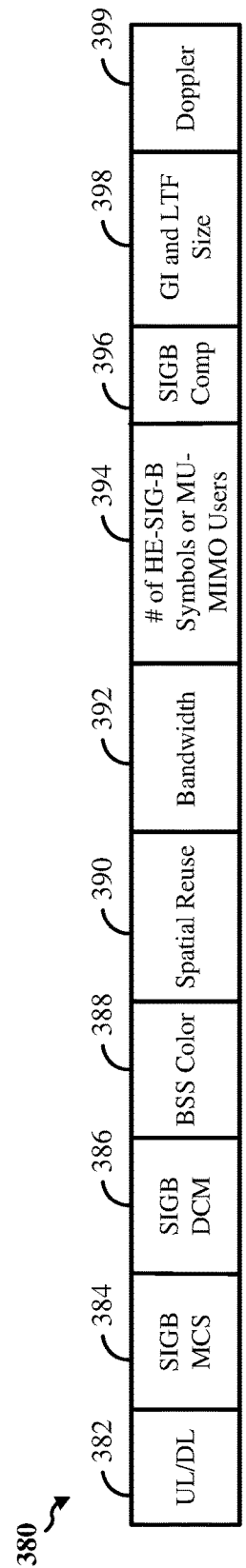
Figure 3A
Figure 3B
Figure 3C

ADAPTIVE DETECTION THRESHOLD FOR CONTENTION-BASED CHANNEL ACCESS

TECHNICAL FIELD

This disclosure relates generally to wireless communication, and more specifically, to random channel access mechanisms on a shared wireless medium.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP in beacon frames, which are periodically broadcasted to enable any STAs within wireless range of the AP to establish or maintain a communication link with the WLAN.

Many wireless networks use random channel access mechanisms to control access to a shared wireless medium. In these wireless networks, wireless devices (including APs and STAs) typically contend with each other using carrier sense multiple access with collision avoidance (CSMA/CA) techniques to gain access to the wireless medium. In general, the wireless device that randomly selects the lowest backoff number wins the medium access contention operation, and may be granted access to the wireless medium for a period of time commonly referred to as a transmit opportunity (TXOP). Other wireless devices are generally not permitted to transmit during the TXOP to avoid interfering with transmissions from the TXOP owner.

Although some random channel access mechanisms afford high-priority traffic a greater likelihood of gaining medium access than low-priority traffic, unpredictable outcomes of medium access contention operations may prevent WLANs from guaranteeing certain levels of throughput or satisfying certain latency requirements. As a result, high-priority traffic having strict end-to-end latency and throughput requirements, such as real-time gaming applications, may not meet some performance metrics when carried by a WLAN, particularly at times when contention levels on the shared wireless medium are heightened.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may be performed by a first wireless communication device associated with a basic service set (BSS), and may include receiving, on one or more links of a wireless medium, a plurality of packets transmitted during a measurement window by a second wireless communication device associated with the BSS, determining a received signal strength indicator (RSSI) value of the plurality of packets received from the second wireless communication device during the measurement window, determining a level of overlapping basic service set (OBSS) interference on the wireless medium during the measurement window, and adjusting one or more of a packet detect (PD) threshold, an OBSS PD threshold, or an energy detect (ED) threshold based on the determined RSSI value and the level of OBSS interference. In some implementations, the method may further include transmitting a spatial reuse (SR) packet to the second wireless communication device concurrently with detecting at least one OBSS packet based on the level of OBSS interference being less than the adjusted OBSS PD threshold. In some other implementations, the method may further include sensing a level of energy on the wireless medium, and transmitting one or more packets to the second wireless communication device based on the sensed energy level being less than the adjusted ED threshold.

In some implementations, the adjusting includes adjusting the PD threshold, and the method further includes performing a clear channel assessment (CCA) on the wireless medium using the adjusted PD threshold, gaining access to the wireless medium for a transmit opportunity (TXOP) based on the CCA, and transmitting one or more packets to the second wireless communication device during the TXOP. In some instances, the adjusting of the PD threshold includes adjusting the PD threshold to increase a margin between the adjusted PD threshold and the determined RSSI value concurrently with maintaining the adjusted PD threshold higher than the level of OBSS interference.

In some other implementations, the adjusting of the PD threshold includes determining a portion of the measurement window during which a channel utilization of OBSS traffic is greater than a first configured value, increasing the PD threshold in response to determining that the portion is of a longer duration than a time period indicated by a second configured value, and refraining from increasing the PD threshold in response to determining that the portion is of a shorter duration than the time period indicated by the second configured value. In some instances, the channel utilization of the OBSS traffic may be based at least in part on the level of OBSS interference. In some other instances, the OBSS interference is associated with a plurality of OBSS packets, and determining the portion includes identifying each OBSS packet of the plurality of OBSS packets based on information contained in a signaling field of the respective OBSS packet. In some implementations, the information includes one or more of a length or duration value indicated in a legacy signaling field (L-SIG) of the respective OBSS packet, a transmit opportunity (TXOP) duration indicated in a non-legacy signaling field of the respective OBSS packet, or a duration/ID value in a medium access control (MAC) header of the respective OBSS packet.

In some implementations, the adjusting of the OBSS PD threshold includes determining one or more performance metrics for the one or more links on which the plurality of packets are received from the second wireless communication device, increasing the OBSS PD threshold in response to determining that the one or more determined performance metrics are greater than a respective configured value, and maintaining or decreasing the OBSS PD threshold in response to determining that the one or more determined performance metrics are less than the respective configured value. In some instances, the performance metrics include one or more of a packet error rate (PER), channel conditions, a number of acknowledgement (ACK) timeouts, a throughput loss, or an effective data rate of the transmission of the plurality of packets from the second wireless communication device. In some other instances, the OBSS PD threshold is adjusted to increase the performance metrics concurrently with increasing the number of spatial reuse (SR) transmission opportunities available to the first wireless communication device.

In some other implementations, the adjusting of the OBSS PD threshold includes determining a channel utilization of OBSS traffic associated with the OBSS interference, and increasing the OBSS PD threshold in response to determining that the OBSS channel utilization is greater than a configured value, and refraining from increasing the OBSS PD threshold in response to determining that the OBSS channel utilization is less than the configured value.

In some implementations, the adjusting of the ED threshold includes determining a noise floor of the wireless medium during the measurement window, determining a difference between the determined noise floor and a reference noise floor, and increasing the ED threshold based on the difference. In some other implementations, the adjusting of the ED threshold includes determining a portion of the measurement window during which a level of interference on the wireless medium is greater than the ED threshold, increasing the ED threshold in response to determining that the portion is of a longer duration than a time period indicated by a configured value, and refraining from increasing the ED threshold in response to determining that the portion is of a shorter duration than the time period indicated by the configured value.

Another innovative aspect of the subject matter described in this disclosure can be implemented in a first wireless communication device. The first wireless communication device may include at least one modem, at least one processor communicatively coupled with the at least one modem, and at least one memory communicatively coupled with the at least one processor. The at least one memory may store processor-readable code that, when executed by the at least one processor, causes the first wireless communication device to receive, on one or more links of a wireless medium, a plurality of packets transmitted during a measurement window by a second wireless communication device associated with the BSS, determine a received signal strength indicator (RSSI) value of the plurality of packets received from the second wireless communication device during the measurement window, determine a level of overlapping basic service set (OBSS) interference on the wireless medium during the measurement window, and adjust one or more of a packet detect (PD) threshold, an OBSS PD threshold, or an energy detect (ED) threshold based on the determined RSSI value and the level of OBSS interference.

In some implementations, execution of the processor-readable code may further cause the first wireless communication device to transmit a spatial reuse (SR) packet to the second wireless communication device concurrently with detecting at least one OBSS packet based on the level of OBSS interference being less than the adjusted OBSS PD threshold. In some other implementations, execution of the processor-readable code may further cause the first wireless communication device to sense a level of energy on the wireless medium, and transmit one or more packets to the second wireless communication device based on the sensed energy level being less than the adjusted ED threshold.

In some implementations, the adjusting includes adjusting the PD threshold, and execution of the processor-readable code may further cause the first wireless communication device to perform a clear channel assessment (CCA) on the wireless medium using the adjusted PD threshold, gain access to the wireless medium for a transmit opportunity (TXOP) based on the CCA, and transmit one or more packets to the second wireless communication device during the TXOP. In some instances, the adjusting of the PD threshold includes adjusting the PD threshold to increase a margin between the adjusted PD threshold and the determined RSSI value concurrently with maintaining the adjusted PD threshold higher than the level of OBSS interference.

In some other implementations, the adjusting of the PD threshold includes determining a portion of the measurement window during which a channel utilization of OBSS traffic is greater than a first configured value, increasing the PD threshold in response to determining that the portion is of a greater duration than a time period indicated by a second configured value, and refraining from increasing the PD threshold in response to determining that the portion is of a shorter duration than the time period indicated by the second configured value. In some instances, the channel utilization of the OBSS traffic may be based at least in part on the level of the OBSS interference. In some other instances, the OBSS interference is associated with a plurality of OBSS packets, and determining the portion includes identifying each OBSS packet of the plurality of OBSS packets based on information contained in a signaling field of the respective OBSS packet. In some implementations, the information includes one or more of a length or duration value indicated in a legacy signaling field (L-SIG) of the respective OBSS packet, a transmit opportunity (TXOP) duration indicated in a non-legacy signaling field of the respective OBSS packet, or a duration/ID value in a medium access control (MAC) header of the respective OBSS packet.

In some implementations, the adjusting of the OBSS PD threshold includes determining one or more performance metrics for the one or more links on which the plurality of packets are received from the second wireless communication device, increasing the OBSS PD threshold in response to determining that the one or more determined performance metrics are greater than a respective configured value, and maintaining or decreasing the OBSS PD threshold in response to determining that the one or more determined performance metrics are less than the respective configured value. In some instances, the performance metrics include one or more of a packet error rate (PER), channel conditions, a number of acknowledgement (ACK) timeouts, a throughput loss, or an effective data rate of the transmission of the plurality of packets from the second wireless communication device. In some other instances, the OBSS PD threshold is adjusted to increase the performance metrics concurrently with increasing the number of spatial reuse (SR) transmission opportunities available to the first wireless communication device.

In some other implementations, the adjusting of the OBSS PD threshold includes determining a channel utilization of OBSS traffic associated with the OBSS interference, and increasing the OBSS PD threshold in response to determining that the OBSS channel utilization is greater than a configured value, and refraining from increasing the OBSS PD threshold in response to determining that the OBSS channel utilization is less than the configured value.

In some implementations, the adjusting of the ED threshold includes determining a noise floor of the wireless medium during the measurement window, determining a difference between the determined noise floor and a reference noise floor, and increasing the ED threshold based on the difference. In some other implementations, the adjusting of the ED threshold includes determining a portion of the measurement window during which a level of interference on the wireless medium is greater than the ED threshold, increasing the ED threshold in response to determining that the portion is of a longer duration than a time period indicated by a configured value, and refraining from increasing the ED threshold in response to determining that the portion is of a shorter duration than the time period indicated by the configured value.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 3A shows an example PDU usable for communications between an AP and one or more STAs.

FIG. 3B shows another example PDU usable for communications between an AP and one or more STAs.

FIG. 3C shows an example signal field usable in a PDU.

Like reference numbers and designations in the various drawings indicate like elements.

DETAILED DESCRIPTION

Figure 1:
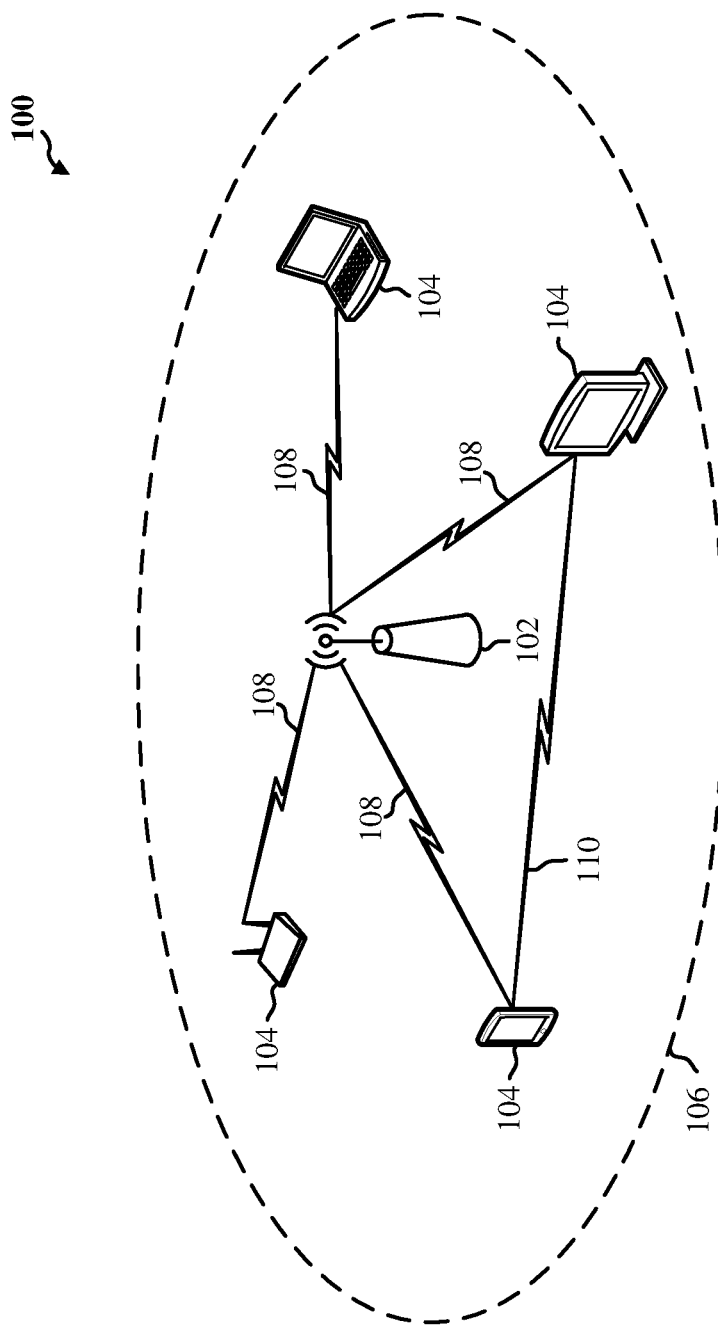
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to medium access contention operations on a shared wireless medium. Some implementations more specifically relate to ensuring that a wireless network can meet certain end-to-end latency and throughput requirements of high-priority traffic while continuing to use existing channel access mechanisms for controlling access to the shared wireless medium. In some implementations, the high-priority traffic may be associated with an ultra-low latency application having minimum throughput requirements and maximum specified delays, and may be carried in a first WLAN that includes at least a first wireless communication device and a second wireless communication device. In some instances, the first WLAN may correspond to a stationary wireless network. For example, the high-priority traffic may be a real-time augmented reality (AR) application, a real-time virtual reality (VR) application, or a real-time gaming application, and the stationary wireless network may be a home or office wireless network. In some other instances, the first WLAN may correspond to a mobile or non-stationary wireless network. For example, the high-priority traffic may be real-time automotive application such as a streaming application (such as CarPlay®), and the mobile or non-stationary wireless network may be a hotspot provided by a vehicle or a mobile communication device associated with an occupant of the vehicle.

In some implementations, the first WLAN may be sufficiently proximate to a second WLAN different than the first WLAN such that communications transmitted from the second WLAN may interfere with communications of the first WLAN. In some instances, communications transmitted by wireless devices belonging to the second WLAN may be received, or at least detected, by one or more wireless devices belonging to the first WLAN. As such, the second WLAN may be considered as an overlapping basic service set (OBSS) by the first WLAN, and communications transmitted by wireless devices belonging to the second WLAN may be considered as OSBB interference by wireless devices belonging to the first WLAN.

In some implementations, wireless devices belonging to the first WLAN may selectively adjust one or more parameters of the random channel access mechanism based on intra-BSS interference and inter-BSS interference on the wireless medium, where the intra-BSS interference refers to interference resulting from communications transmitted by wireless devices belonging to the first WLAN, and the inter-BSS interference refers to interference resulting from communications transmitted by wireless devices belonging to the second WLAN. In some instances, the level of intra-BSS interference may be indicated by RSSI values of a plurality of packets transmitted from a second wireless communication device to a first wireless communication device, where both the first and second wireless communication devices belong to the first WLAN and are associated with the same BSS. In some instances, the level of inter-BSS interference, which may also be referred to herein as OBSS interference, may be indicated by RSSI values of one or more packets transmitted from a wireless communication device belonging to the second WLAN and received, or at least detected, by the first wireless communication device belonging to the first WLAN.

In some implementations, the first wireless communication device may determine an amount by which each of the one or more parameters of the random channel access mechanism is to be adjusted during a measurement window. The measurement window may be of any suitable time period that allows the first wireless communication device to measure or determine levels of intra-BSS interference on the wireless medium and levels of inter-BSS interference (or OBSS interference) on the wireless medium. In some implementations, the random channel access mechanism may be an enhanced distributed channel access (EDCA) mechanism, and the one or more parameters may include a packet detect (PD) threshold, an energy detect (ED) threshold, and an OBSS threshold.

In some implementations, the PD threshold may be adjusted to increase a margin between the adjusted PD threshold and the determined RSSI value concurrently with maintaining the adjusted PD threshold higher than the level of OBSS interference. In some other implementations, the PD threshold may be increased in response to determining that a portion of the measurement window during which a channel utilization of OBSS traffic is greater than a first configured value is of a longer duration than a time period indicated by a second configured value, and may be maintained in response to determining that the portion of the measurement window is of a shorter duration than the time period indicated by the second configured value. In some aspects, the channel utilization of the OBSS traffic may be based at least in part on the level of OBSS interference.

In some implementations, the OBSS PD threshold may be increased in response to determining that one or more performance metrics are greater than a respective configured value, and may be maintained or decreased in response to determining that the one or more performance metrics are less than the respective configured value. In some other implementations, the OBSS PD threshold may be increased in response to determining that the OBSS channel utilization is greater than a configured value, and may be maintained in response to determining that the OBSS channel utilization is less than the configured value.

In some implementations, the ED threshold may be increased in response to determining that a portion of the measurement window during which a level of interference on the wireless medium is greater than the ED threshold is of a longer duration than a time period indicated by a configured value, and may be maintained in response to determining that the portion of the measurement window is of a shorter duration than the time period indicated by the configured value. In some other implementations, the ED threshold may be increased in response to determining that a difference between the noise floor of the shared wireless medium is greater than a reference noise floor, and may not be increased in response to determining that the difference between the noise floor of the shared wireless medium is not greater than the reference noise floor.

Particular implementations of the subject matter described in this disclosure can be implemented to realize one or more of the following potential advantages. By selectively adjusting one or more parameters of a random channel access mechanism based on determined levels of intra-BSS interference and inter-BSS interference on a shared wireless medium, a wireless communication device implementing one or more aspects of the present disclosure may relax its conditions for gaining access to the shared wireless medium, relative to other wireless communication devices, in the presence of at least some interfering transmissions. Relaxing the conditions for the wireless communication device to gain channel access may increase the likelihood that the wireless communication device wins a particular medium access contention operation, and may also increase the frequency with which the wireless communication device is afforded an opportunity to contend for medium access (such as by reducing the conditions for determining that the shared wireless medium is idle). In this way, implementations of the subject matter disclosed herein may increase the ability of a WLAN to meet strict end-to-end latency and throughput requirements of high-priority traffic while continuing to employ existing random channel access mechanisms. The ability to ensure certain performance metrics of high-priority traffic without altering random channel access mechanisms specified by one or more of the IEEE 802.11 family of wireless communication protocol standards may allow existing WLANs that adopt various aspects of the subject matter disclosed herein to be used for real-time gaming applications, real-time AR applications, real-time VR applications, and other real-time traffic having certain throughput and latency requirements.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11 ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11 ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
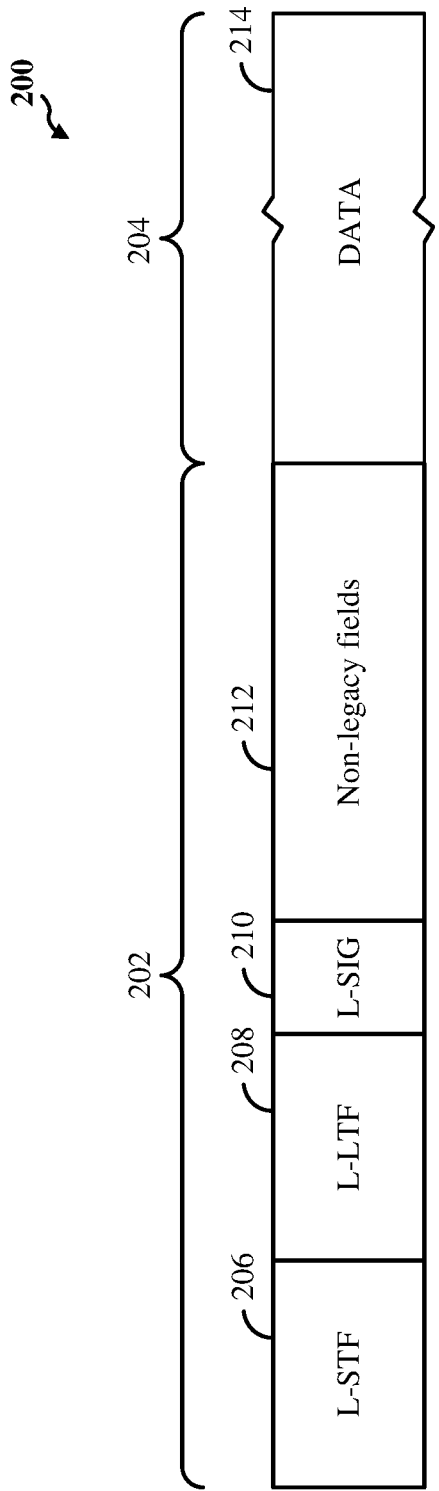
FIG. 2A shows an example protocol data unit (PDU) usable for communications between an access point (AP) and one or more stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
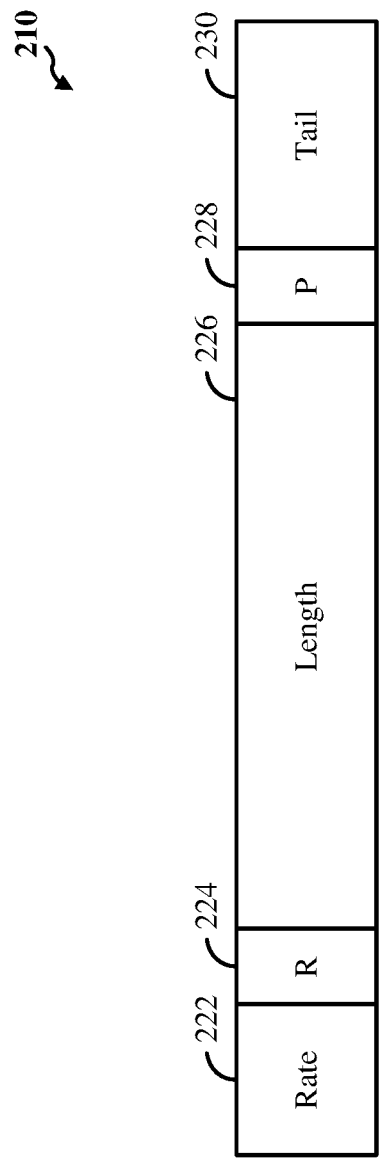
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (vs) or other time units.

FIG. 3A shows an example PPDU 300 usable for wireless communication between an AP and one or more STAs. The PPDU 300 may be used for SU, OFDMA or MU-MIMO transmissions. The PPDU 300 may be formatted as a High Efficiency (HE) WLAN PPDU in accordance with the IEEE 802.11ax amendment to the IEEE 802.11 wireless communication protocol standard. The PPDU 300 includes a PHY preamble including a legacy portion 302 and a non-legacy portion 304. The PPDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PPDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

FIG. 3B shows another example PPDU 350 usable for wireless communication between an AP and one or more STAs. The PPDU 350 may be used for SU, OFDMA or MU-MIMO transmissions. The PPDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

FIG. 3C shows an example signal field 380 that may be carried in a WLAN PPDU. In implementations for which the signal field 380 is carried in an HE PPDU, the signal field 380 may be, or may correspond to, a HE-SIG-A field (such as the HE-SIG-A field 316 of the PPDU 300 of FIG. 3A). In implementations for which the signal field 380 is carried in an EHT PPDU, the signal field 380 may be, or may correspond to, an EHT-SIG field (such as the EHT-SIG field 368 of the PPDU 350 of FIG. 3B). The signal field 380 may include an UL/DL subfield 382 indicating whether the PPDU 400 is sent UL or DL, may include a SIGB-MCS subfield 384 indicating the MCS for the HE-SIGB field 412, and may include a SIGB DCM subfield 386 indicating whether or not the HE-SIG-B field 412 is modulated with dual carrier modulation (DCM). The signal field 380 may further include a BSS color field 388 indicating a BSS color identifying the BSS. Each device in a BSS may identify itself with the same BSS color. Thus, receiving a transmission having a different BSS color indicates the transmission is from another BSS, such as an OBSS.

The signal field 380 may further include a spatial reuse subfield 390 indicating whether spatial reuse is allowed during transmission of the corresponding PPDU. The signal field 380 may further include a bandwidth subfield 392 indicating a bandwidth of the PPDU data field, such as 20 MHz, 40 MHz, 80 MHz, 160 MHz, and so on. The signal field 380 may further include a number of HE-SIG-B symbols or MU-MIMO users subfield 394 indicating either a number of OFDM symbols in the HE-SIG-B field 412 or a number of MU-MIMO users. The signal field 380 may further include a SIGB compression subfield 396 indicating whether or not a common signaling field is present, may include a GI+LTF size subfield 398 indicating the guard interval (GI) duration and the size of the non-legacy LTFs. The signal field 380 may further include a doppler subfield 399 indicating whether a number of OFDM symbols in the PPDU data field is larger than a signaled midamble periodicity plus one, and the midamble is present, or that the number of OFDM symbols in the PPDU data field data field 418 is less than or equal to the signaled midamble periodicity plus 1, that the midamble is not present, but that the channel is fast varying.

Figure 4:
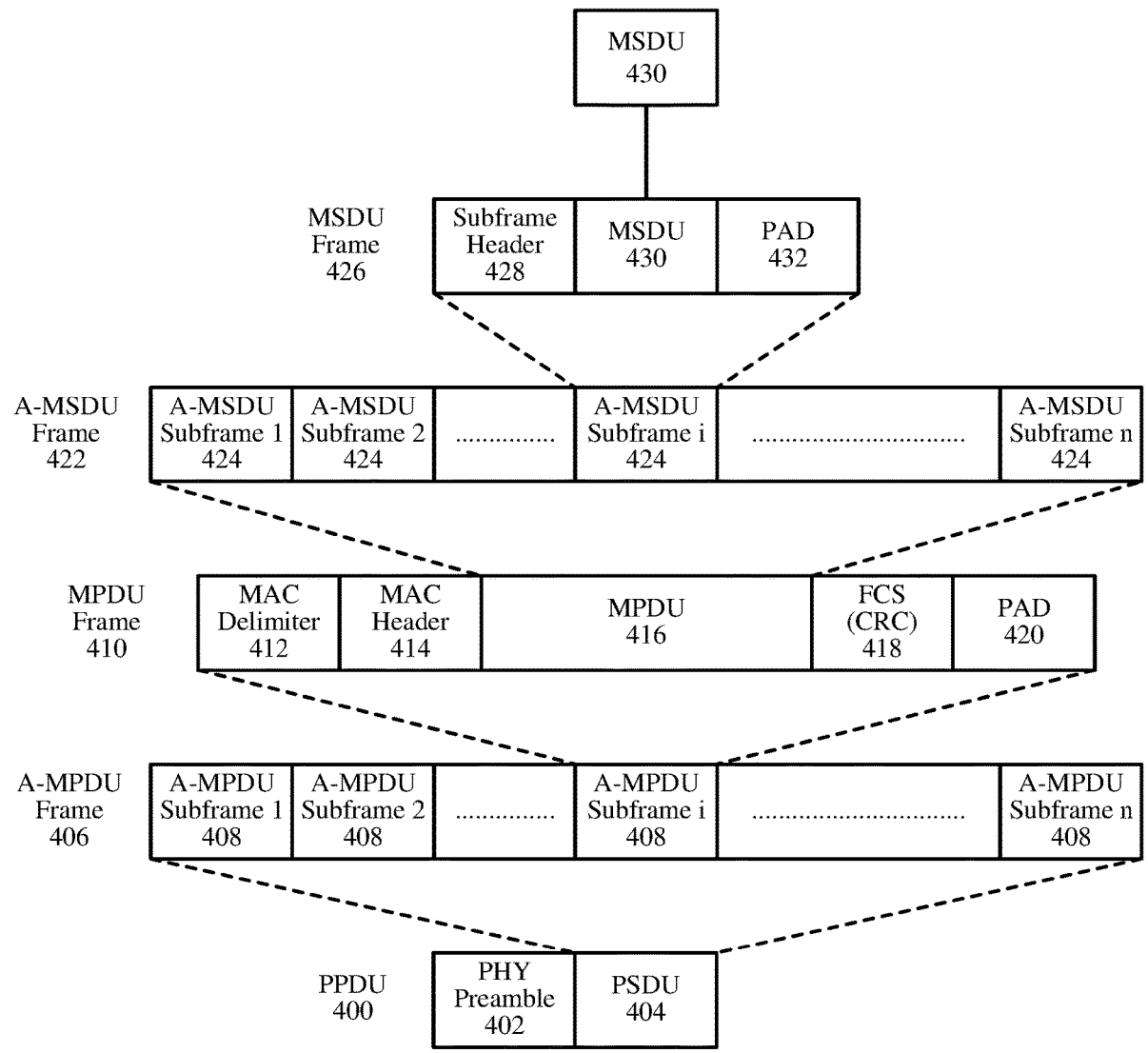
FIG. 4 shows an example physical layer convergence protocol (PLCP) protocol data unit (PPDU) usable for communications between an AP and one or more STAs.

FIG. 4 shows an example PPDU 400 usable for communications between an AP 102 and one or more STAs 104. As described above, each PPDU 400 includes a PHY preamble 402 and a PSDU 404. Each PSDU 404 may represent (or "carry") one or more MAC protocol data units (MPDUs) 416. For example, each PSDU 404 may carry an aggregated MPDU (A-MPDU) 406 that includes an aggregation of multiple A-MPDU subframes 408. Each A-MPDU subframe 406 may include an MPDU frame 410 that includes a MAC delimiter 412 and a MAC header 414 prior to the accompanying MPDU 416, which comprises the data portion ("payload" or "frame body") of the MPDU frame 410. Each MPDU frame 410 may also include a frame check sequence (FCS) field 418 for error detection (for example, the FCS field may include a cyclic redundancy check (CRC)) and padding bits 420. The MPDU 416 may carry one or more MAC service data units (MSDUs) 416. For example, the MPDU 416 may carry an aggregated MSDU (A-MSDU) 422 including multiple A-MSDU subframes 424. Each A-MSDU subframe 424 contains a corresponding MSDU 430 preceded by a subframe header 428 and in some cases followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body 416. The MAC header 414 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 414 also includes one or more fields indicating addresses for the data encapsulated within the frame body 416. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and then contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the relevant threshold.

As described above, the DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be).

When the NAV reaches 0, the wireless communication device performs the physical carrier sensing. If the channel remains idle for the appropriate IFS (for example, the DIFS), the wireless communication device initiates a backoff timer, which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication devices generates a new PPDU for transmission in a new TXOP, it randomly selects a new backoff timer duration. The available distribution of the numbers that may be randomly selected for the backoff timer is referred to as the contention window (CW). If, when the backoff timer expires, the wireless communication device transmits the PPDU, but the medium is still busy, there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may then increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, then proceed to initiate the new backoff timer. There are different CW and TXOP durations for each of the four access categories (ACs): voice (AC_VO), video (AC_VI), background (AC_BK), and best effort (AC_BE). This enables particular types of traffic to be prioritized in the network.

Some APs and STAs may be configured to implement spatial reuse techniques. For example, APs and STAs configured for communications using IEEE 802.11ax or 802.11be may be configured with a BSS color. APs associated with different BSSs may be associated with different BSS colors. If an AP or a STA detects a wireless packet from another wireless communication device while contending for access, the AP or STA may apply different contention parameters based on whether the wireless packet is transmitted by, or transmitted to, another wireless communication device within its BSS or from a wireless communication device from an overlapping BSS (OBSS), as determined by a BSS color indication in a preamble of the wireless packet. For example, if the BSS color associated with the wireless packet is the same as the BSS color of the AP or STA, the AP or STA may use a first received signal strength indication (RSSI) detection threshold when performing a CCA on the wireless channel. However, if the BSS color associated with the wireless packet is different than the BSS color of the AP or STA, the AP or STA may use a second RSSI detection threshold in lieu of using the first RSSI detection threshold when performing the CCA on the wireless channel, the second RSSI detection threshold being greater than the first RSSI detection threshold. In this way, the requirements for winning contention are relaxed when interfering transmissions are associated with an OBSS.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5:
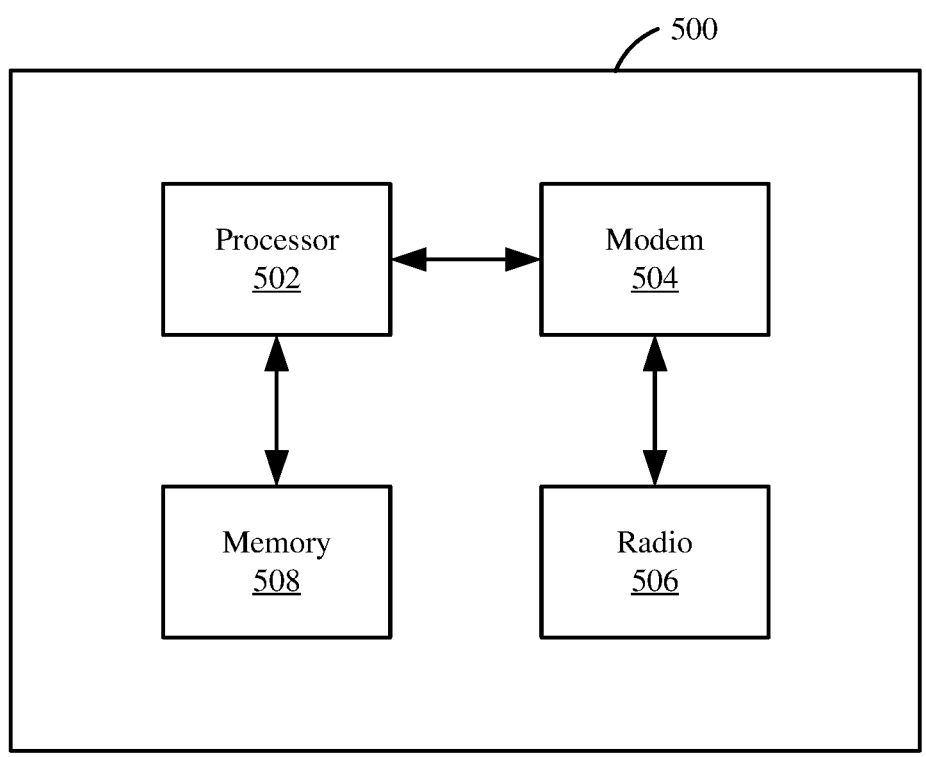
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 500 can be, or can include, a chip, system on chip (SoC), chipset, package or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more processors, processing blocks or processing elements 504 (collectively "the processor 504") coupled with the modem 502. In some implementations, the wireless communication device 500 additionally includes one or more radios 506 (collectively "the radio 506") coupled with the modem 502. In some implementations, the wireless communication device 500 further includes one or more memory blocks or elements 508 (collectively "the memory 508") coupled with the processor 504 or the modem 502.

The modem 502 can include an intelligent hardware block or device such as, for example, an application-specific integrated circuit (ASIC), among other examples. The modem 502 is generally configured to implement a PHY layer, and in some implementations, also a portion of a MAC layer (for example, a hardware portion of the MAC layer).

For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC) circuitry, a coder, a decoder, a multiplexer and a demultiplexer. For example, while in a transmission mode, data obtained from the processor 506 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 504, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 506) for processing, evaluation or interpretation.

The radio 504 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and at least a portion of a MAC layer configured to perform various operations related to the generation, transmission, reception and processing of MPDUs, frames or packets. In some implementations, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 506 may generally control the modem 502 to cause the modem to perform various operations described above.

The memory 504 can include tangible storage media such as random-access memory (RAM) or read-only memory (ROM), or combinations thereof. The memory 504 also can store non-transitory processor- or computer-executable software (SW) code containing instructions that, when executed by the processor 506, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 6B:
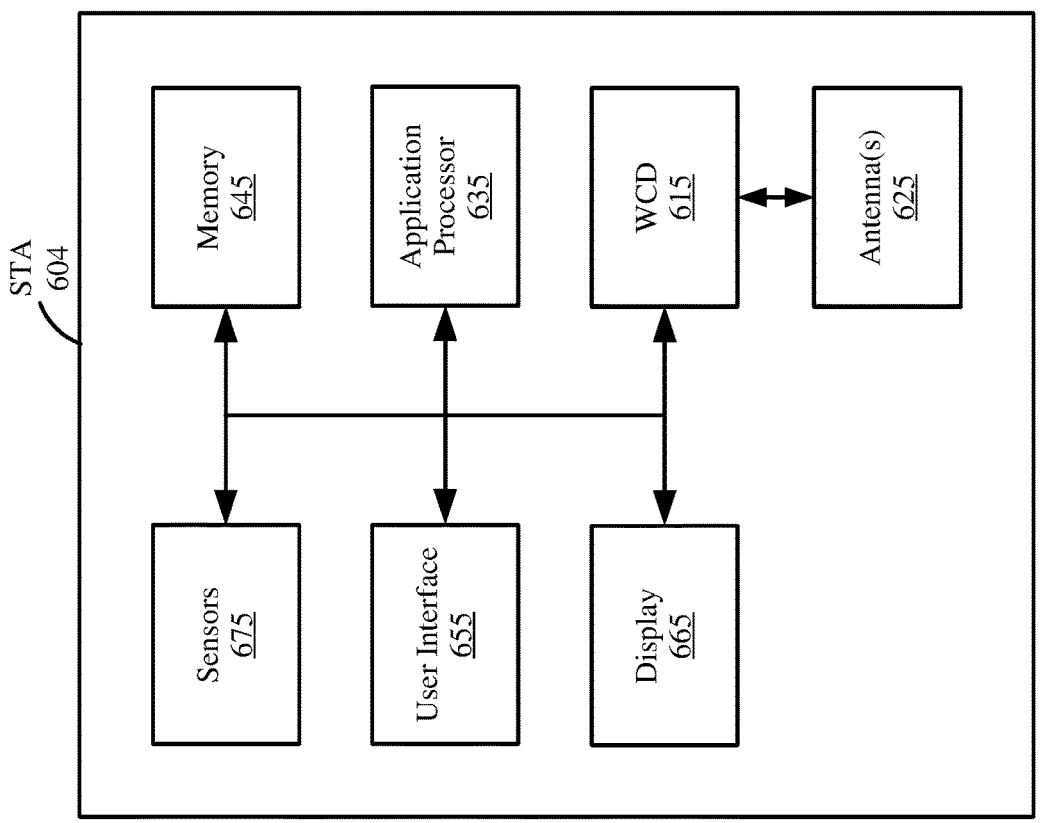
FIG. 6B shows a block diagram of an example STA.
Figure 6A:
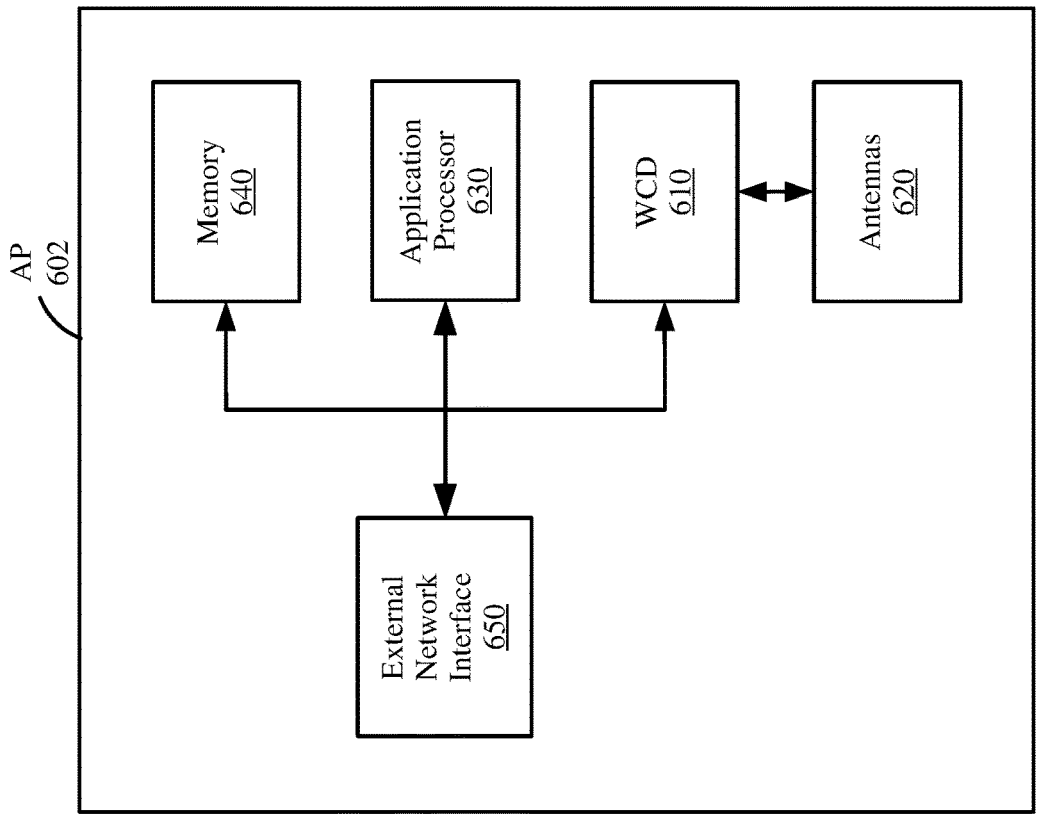
FIG. 6A shows a block diagram of an example AP.

FIG. 6A shows a block diagram of an example AP 602. For example, the AP 602 can be an example implementation of the AP 102 described with reference to FIG. 1. The AP 602 includes a wireless communication device (WCD) 610 (although the AP 602 may itself also be referred to generally as a wireless communication device as used herein). For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615 (although the STA 604 may itself also be referred to generally as a wireless communication device as used herein). For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

As mentioned above, wireless communication devices may contend with each other for access to a shared wireless medium. The IEEE 802.11 standards define a distributed coordination function (DCF) in which wireless communication devices use carrier sensing techniques to determine that the wireless medium has been idle for a period of time before attempting to transmit data on the wireless medium. Many wireless communication devices employ an Enhanced Distributed Channel Access (EDCA) mechanism for random channel access operations. The EDCA mechanism is an example of a listen-before-talk (LBT) channel access mechanism, and may prevent multiple devices from accessing the wireless medium at the same time by arbitrating access to the wireless medium using randomly selected numbers representing periods of time during which the wireless medium is to remain idle before a given wireless communication device may transmit on the wireless medium.

As the number of wireless communication devices that share a wireless medium increases, levels of contention between the wireless communication devices increases, as does the likelihood of collisions on the wireless medium. Heightened levels of contention and more frequent collisions may increase latencies and reduce throughput on the shared wireless medium. Interference caused by communications transmitted from one or more nearby wireless networks, such as overlapping basic service sets (OBSSs), may exacerbate such latencies and further reduce throughput on the shared wireless medium. Heightened contention levels, more frequent collisions, and increased levels of OBSS interference, among other factors, may render it difficult for a WLAN to meet or maintain certain latency and throughput requirements of high-priority traffic.

Various implementations relate generally to medium access contention operations on a shared wireless medium. Some implementations more specifically relate to ensuring that a wireless network can meet certain end-to-end latency and throughput requirements of high-priority traffic while continuing to use existing channel access mechanisms for controlling access to the shared wireless medium. The high-priority traffic may be carried in a first WLAN that includes at least a first wireless communication device and a second wireless communication device, and the first WLAN may be subject to OBSS interference from a nearby second WLAN. In some implementations, the first wireless communication device may determine the signal strength of packets transmitted from the second wireless communication device, may determine a level of OBSS interference on the wireless medium, and may adjust one or more parameters of a random channel access mechanism based on the level of OBSS interference on the wireless medium and the determined signal strengths of the packets received from the second wireless communication device. In some instances, the channel access mechanism may be an enhanced distributed channel access (EDCA) mechanism, and the one or more parameters may include the packet detect (PD) threshold, the energy detect (ED) threshold, and the OBSS threshold.

Particular implementations of the subject matter described in this disclosure can be implemented to realize one or more of the following potential advantages. By selectively adjusting one or more parameters of a random channel access mechanism based on levels of intra-BSS interference and inter-BSS interference on the shared wireless medium, aspects of the present disclosure may relax channel access conditions for a given wireless communication device in the presence of increased OBSS interference and heightened contention levels, which may increase the likelihood and the frequency with which the wireless communication device is able to gain channel access. In this way, implementations of the subject matter disclosed herein may increase the ability of a WLAN to meet strict end-to-end latency and throughput requirements of high-priority traffic while continuing to employ existing random channel access mechanisms.

Figure 7:
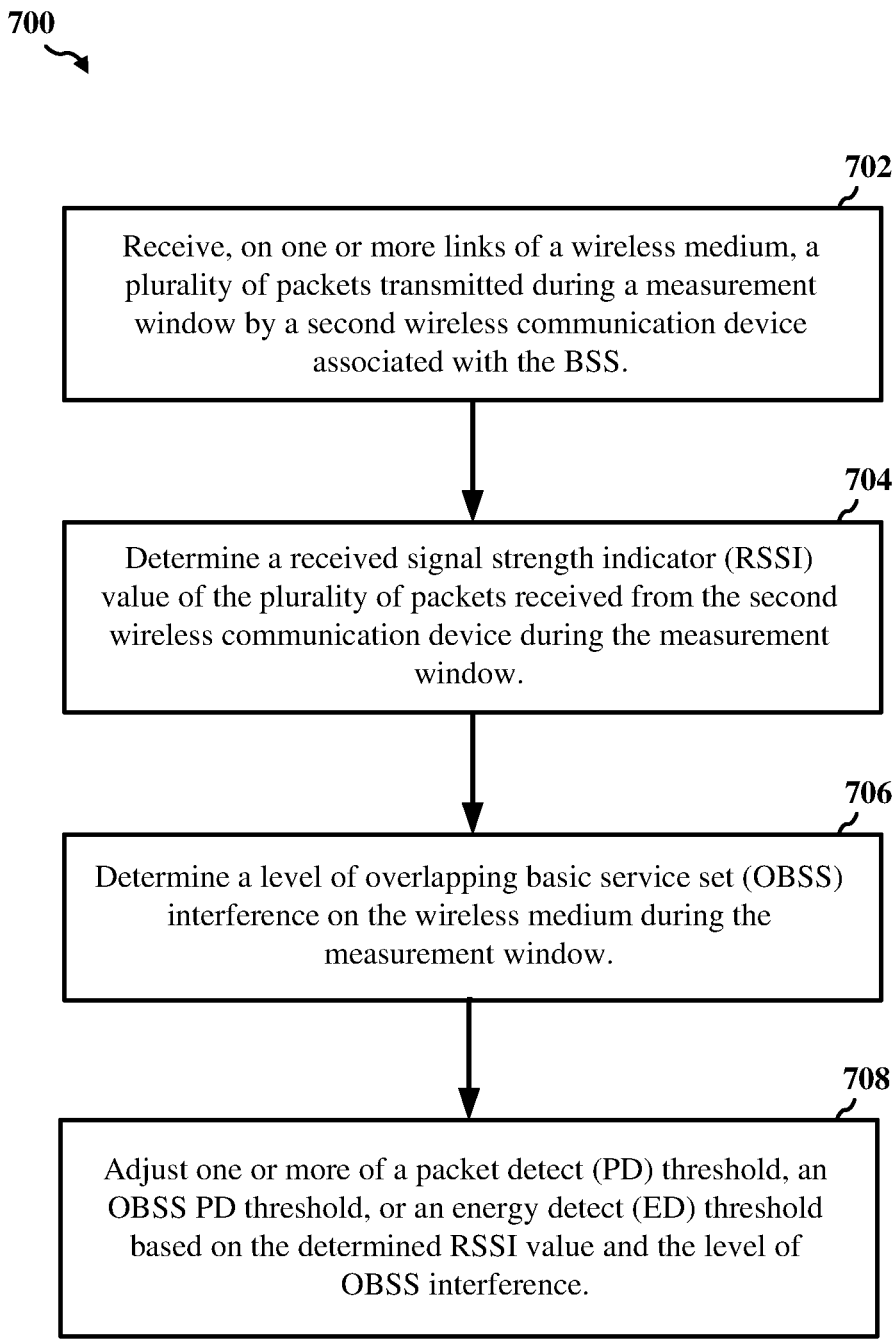
FIG. 7 shows a flowchart illustrating an example process for wireless communication that supports adjusting one or more channel access parameters according to some implementations.

FIG. 7 shows a flowchart illustrating an example process 700 for wireless communication that supports adjusting one or more channel access parameters according to some implementations. The process 700 may be performed by a first wireless communication device, such as the wireless communication device 500 described above with reference to FIG. 5. In some implementations, the first wireless communication device may operate as or within an AP, such as one of the APs 102 and 602 described above with reference to FIGS. 1 and 6A, respectively. In some other implementations, the first wireless communication device may operate as or within a STA, such as one of the STAs 104 and 604 described above with reference to FIGS. 1 and 6B, respectively. In some instances, the first wireless communication device may belong to a first WLAN that also includes at least a second wireless communication device. The first WLAN may correspond to a basic service set (BSS), and may be subject to interference from a nearby wireless network corresponding to an overlapping basic service set (OBSS).

At block 702, the first wireless communication device receives, on one or more links of a wireless medium, a plurality of packets transmitted during a measurement window by the second wireless communication device. At block 704, the first wireless communication device determines a received signal strength indicator (RSSI) value of the plurality of packets received from the second wireless communication device during the measurement window. At block 706, the first wireless communication device determines a level of OBSS interference on the wireless medium during the measurement window. At block 708, the first wireless communication device adjusts one or more of a packet detect (PD) threshold, an OBSS PD threshold, or an energy detect (ED) threshold based on the determined RSSI value and the level of OBSS interference.

In some implementations, the RSSI values of packets received from the second wireless communication device may indicate a level of intra-BSS interference on the wireless medium, and the level of OBSS interference may correspond to or indicate a level of inter-BSS interference on the shared wireless medium. In some instances, the level of OBSS interference may be based on RSSI values measured for one or more packets transmitted from the OBSS.

Figure 8:
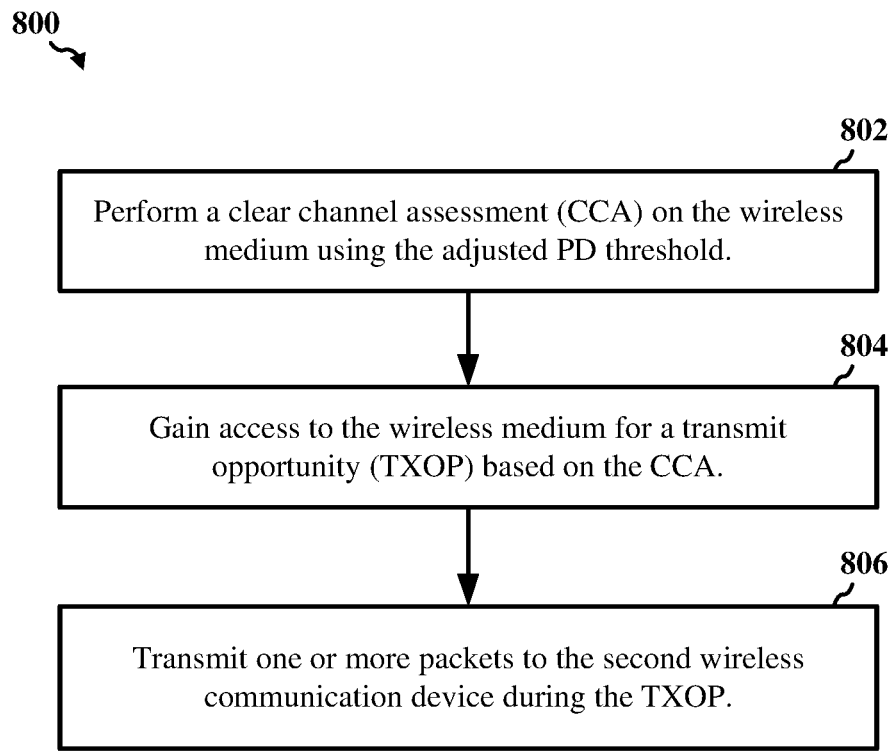
FIG. 8 shows a flowchart illustrating an example process for wireless communication that supports adjusting one or more channel access parameters according to some other implementations.

FIG. 8 shows a flowchart illustrating an example process 800 for wireless communication that supports adjusting one or more channel access parameters according to some other implementations. The process 800 may be performed by a first wireless communication device, such as the wireless communication device 500 described above with reference to FIG. 5. In some implementations, the first wireless communication device may operate as or within an AP, such as one of the APs 102 and 602 described above with reference to FIGS. 1 and 6A, respectively. In some other implementations, the first wireless communication device may operate as or within a STA, such as one of the STAs 104 and 604 described above with reference to FIGS. 1 and 6B, respectively.

In some implementations, the process 800 may be performed after adjusting one or more of the PD threshold, the OBSS PD threshold, or the ED threshold in block 708 of FIG. 7. For example, at block 802, the first wireless communication device performs a clear channel assessment (CCA) on the wireless medium using the adjusted PD threshold. At block 804, the first wireless communication device gains access to the wireless medium for a transmit opportunity (TXOP) based on the CCA. At block 806, the first wireless communication device transmits one or more packets to the second wireless communication device during the TXOP.

In some implementations, the first wireless communication device performs the CCA by detecting a presence of WLAN packets on the wireless medium (such as by determining a presence of, or determining a correlation with, one or more symbols in a signaling field of the packet's preamble), and compares RSSI values of the detected packets with the adjusted PD threshold. For example, when the RSSI values of the detected packets exceed the adjusted PD threshold, the first wireless communication device determines that the wireless medium is busy, and may defer data transmissions. Conversely, when the RSSI values of the detected packets do not exceed the adjusted PD threshold, the first wireless communication device determines that the wireless medium is idle, and may continue sensing the medium (such as by continuing to perform the CCA). In some instances, the first wireless communication device may also decrement its backoff counter after the wireless medium has been idle for the appropriate IFS duration (or may gain medium access if the backoff counter reaches zero).

In some instances, the first wireless communication device may decrease the likelihood that other transmissions on the wireless medium will result in a CCA busy indication by increasing the PD threshold, for example, allowing the first wireless communication device to gain medium access in the presence of interference that precludes other wireless communication devices from contending for medium access (such as because the other wireless communication devices may generate a CCA busy signal). In some other instances, the first wireless communication device may increase the likelihood that other transmissions on the wireless medium will result in a CCA busy indication, potentially reducing the likelihood of collisions, by decreasing the PD threshold.

Figure 9A:
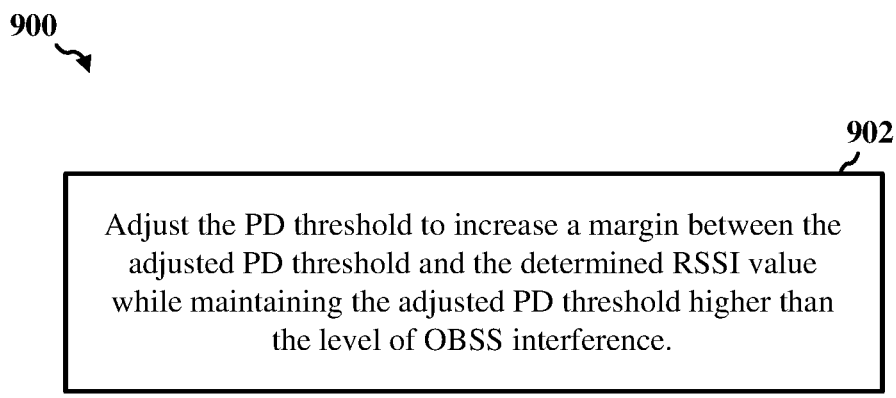
FIG. 9A shows a flowchart illustrating an example process for wireless communication that supports adjusting one or more channel access parameters according to some other implementations.

FIG. 9A shows a flowchart illustrating an example process 900 for wireless communication that supports adjusting one or more channel access parameters according to some other implementations. The process 900 may be performed by a first wireless communication device, such as the wireless communication device 500 described above with reference to FIG. 5. In some implementations, the first wireless communication device may operate as or within an AP, such as one of the APs 102 and 602 described above with reference to FIGS. 1 and 6A, respectively. In some other implementations, the first wireless communication device may operate as or within a STA, such as one of the STAs 104 and 604 described above with reference to FIGS. 1 and 6B, respectively.

In some implementations, the process 900 may be an example implementation of adjusting the PD threshold in block 708 of FIG. 7. At block 902, the first wireless communication device adjusts the PD threshold to increase a margin between the adjusted PD threshold and the determined RSSI value concurrently with maintaining the adjusted PD threshold higher than the level of OBSS interference. By increasing the margin between the adjusted PD threshold and the determined RSSI value (such as by adjusting the PD threshold to a level that is less than the determined RSSI value by at least a configured amount), the first wireless communication device may ensure that it can detect and receive WLAN packets addressed or intended or for the first wireless communication device. Also, by maintaining the adjusted PD threshold higher than the level of OBSS interference on the wireless medium, the first wireless communication device may increase the likelihood of gaining medium access in the presence of OBSS traffic (and may also increase the likelihood of collisions on the wireless medium).

In some other instances, the first wireless communication device may dynamically adjust the PD threshold to maintain the adjusted PD threshold at a level greater than the level of interference on the wireless medium. In this way, the first wireless communication device may reduce the likelihood of false packet detection when contending for medium access to transmit high-priority traffic. For example, the first wireless communication device may not be able to detect valid WLAN packets on the wireless medium while processing a false packet detection (and may also unnecessarily defer its own transmission opportunity), and therefore the ability to dynamically reduce the likelihood of false packet detection when contending for medium access may increase throughput and reduce transmission latencies of the first wireless communication device.

Figure 9B:
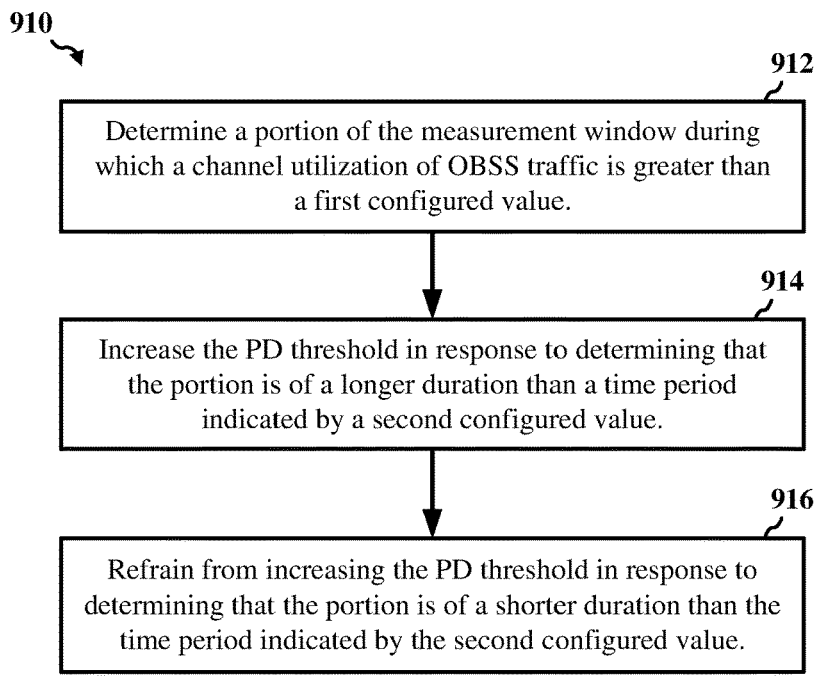
FIG. 9B shows a flowchart illustrating an example process for wireless communication that supports adjusting one or more channel access parameters according to some other implementations.

FIG. 9B shows a flowchart illustrating an example process 910 for wireless communication that supports adjusting one or more channel access parameters according to some other implementations. The process 910 may be performed by a first wireless communication device, such as the wireless communication device 500 described above with reference to FIG. 5. In some implementations, the first wireless communication device may operate as or within an AP, such as one of the APs 102 and 602 described above with reference to FIGS. 1 and 6A, respectively. In some other implementations, the first wireless communication device may operate as or within a STA, such as one of the STAs 104 and 604 described above with reference to FIGS. 1 and 6B, respectively.

In some implementations, the process 910 may be an example implementation of adjusting the PD threshold in block 708 of FIG. 7. For example, at block 912, the first wireless communication device determines a portion of the measurement window during which a channel utilization of OBSS traffic is greater than a first configured value (for example, a first preconfigured value or a first user-selected value). In some implementations, if the first wireless communication device determines, at block 912, that the portion of the measurement window during which the channel utilization of OBSS traffic is greater than the first configured value is of a longer duration than a time period indicated by a second configured value (for example, a second preconfigured value or a second user-selected value) then, at block 914, the first wireless communication device may increase the PD threshold. Conversely, if the first wireless communication device determines, at block 912, that the portion of the measurement window during which the channel utilization of OBSS traffic is greater than the first configured value is of a shorter duration than the time period indicated by the second configured value then, at block 916, the first wireless communication device may refrain from increasing (and in some examples decrease) the PD threshold. In some instances, the channel utilization of the OBSS traffic may be based at least in part on the level of OBSS interference.

As described above, the OBSS PD threshold may govern the opportunities for spatial reuse (SR) transmissions, and the first wireless communication device may adjust the OBSS PD threshold based on whether a channel utilization of OBSS traffic is greater or less than a configured value. As such, if the channel utilization of OBSS traffic is greater than the configured value, the first wireless communication device may increase the likelihood of gaining medium access by increasing the OBSS PD threshold. Conversely, if the channel utilization of OBSS traffic is less than the configured value, the first wireless communication device may refrain from increasing the OBSS PD threshold (for example, by maintaining the OBSS PD threshold) or may decrease the likelihood of collisions on the wireless medium by decreasing the OBSS PD threshold.

In some implementations, the portion of the measurement window during which the level of OBSS interference is greater than the OBSS PD threshold may be indicative of a channel utilization of OBSS traffic. In some instances, the OBSS interference may be associated with a plurality of OBSS packets, and the first wireless communication device may determine the portion by identifying each OBSS packet of the plurality of OBSS packets based on information contained in a signaling field of the respective OBSS packet. The information may include one or more of a length or duration value indicated in a legacy signaling field (L-SIG) of the respective OBSS packet, a transmit opportunity (TXOP) duration indicated in a non-legacy signaling field (for example, EHT-SIG or HE-SIG) of the respective OBSS packet, or a duration/ID value in a medium access control (MAC) header of the respective OBSS packet. In some other instances, the first wireless communication device may identify each OBSS packet of the plurality of OBSS packets based on the BSS Color indicated in the preamble of the respective OBSS packet.

Figure 10A:
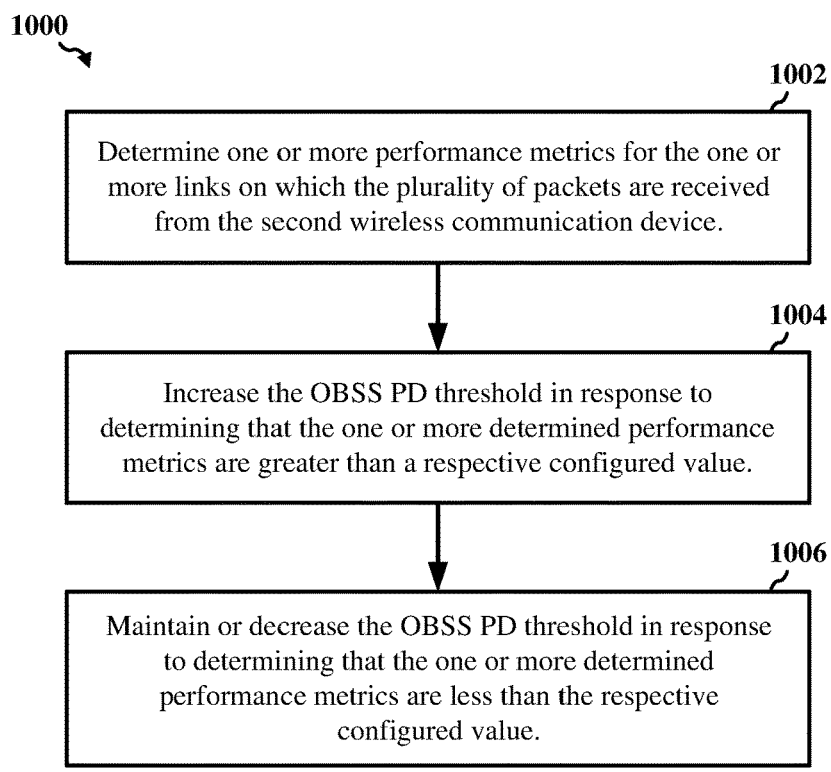
FIG. 10A shows a flowchart illustrating an example process for wireless communication that supports adjusting one or more channel access parameters according to some other implementations.

FIG. 10A shows a flowchart illustrating an example process 1000 for wireless communication that supports adjusting one or more channel access parameters according to some other implementations. The process 1000 may be performed by a first wireless communication device, such as the wireless communication device 500 described above with reference to FIG. 5. In some implementations, the first wireless communication device may operate as or within an AP, such as one of the APs 102 and 602 described above with reference to FIGS. 1 and 6A, respectively. In some other implementations, the first wireless communication device may operate as or within a STA, such as one of the STAs 104 and 604 described above with reference to FIGS. 1 and 6B, respectively.

In some implementations, the process 1000 may be an example implementation of adjusting the OBSS PD threshold in block 708 of FIG. 7. At block 1002, the first wireless communication device determines one or more performance metrics for the one or more links on which the plurality of packets are received from the second wireless communication device. In some examples, the performance metrics include one or more of a packet error rate (PER), a channel condition, a number of acknowledgement (ACK) timeouts, a throughput loss, or an effective data rate of the transmission of the plurality of packets from the second wireless communication device. If the first wireless communication device determines, at block 1002, that the one or more determined performance metrics are greater than a respective configured value (for example, a preconfigured value or a user-selected value) then, at block 1004, the first wireless communication device may increase the OBSS PD threshold. Conversely, if the first wireless communication device determines, at block 1002, that the one or more determined performance metrics are less than the respective configured value then, at block 1006, the first wireless communication device may maintain or decrease the OBSS PD threshold.

By increasing the OBSS PD threshold when the PER, the number of ACK timeouts, or the throughput loss is greater than the respective configured value, the first wireless communication device may increase the likelihood of obtaining a SR opportunity to transmit data to one or more other devices, which may reduce one or more of the PER, the number of ACK timeouts, or the throughput loss. Conversely, by maintaining the OBSS PD threshold when the PER, the number of ACK timeouts, or the throughput loss is less than the respective configured value, the first wireless communication device may maintain the likelihood of obtaining the SR opportunity, and thereby also maintain its transmit power levels for SR transmissions. Further, when decreasing the OBSS PD threshold when the PER, the number of ACK timeouts, or the throughput loss is less than the respective configured value, the first wireless communication device may increase its transmit power levels for SR transmissions (and also decreasing the likelihood of obtaining SR opportunities). In some implementations, the OBSS PD threshold may be adjusted to increase a value of one or more of the performance metrics concurrently with increasing the number of SR transmission opportunities available to the first wireless communication device.

Figure 10B:
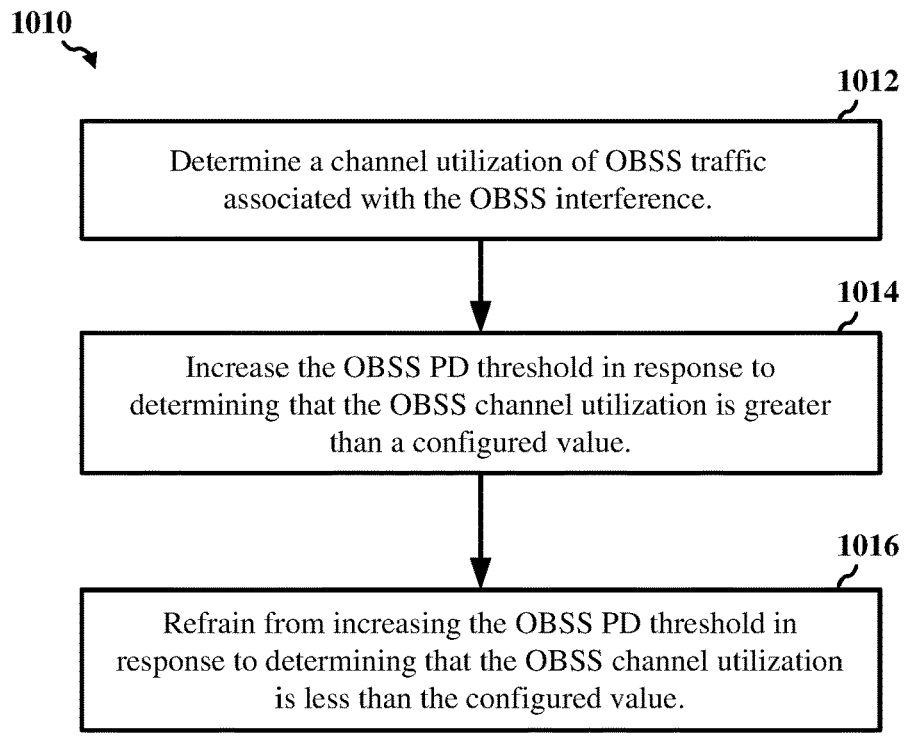
FIG. 10B shows a flowchart illustrating an example process for wireless communication that supports adjusting one or more channel access parameters according to some other implementations.

FIG. 10B shows a flowchart illustrating an example process 1010 for wireless communication that supports adjusting one or more channel access parameters according to some other implementations. The process 1010 may be performed by a first wireless communication device, such as the wireless communication device 500 described above with reference to FIG. 5. In some implementations, the first wireless communication device may operate as or within an AP, such as one of the APs 102 and 602 described above with reference to FIGS. 1 and 6A, respectively. In some other implementations, the first wireless communication device may operate as or within a STA, such as one of the STAs 104 and 604 described above with reference to FIGS. 1 and 6B, respectively.

In some implementations, the process 1010 may be an example implementation of adjusting the OBSS PD threshold in block 708 of FIG. 7. For example, at block 1012, the first wireless communication device determines a channel utilization of OBSS traffic associated with the OBSS interference. If the first wireless communication device determines, at block 1012, that the OBSS channel utilization is greater than a configured value (for example, a preconfigured value or a user-selected value) then, at block 1014, the first wireless communication device may increase the OBSS PD threshold. Conversely, if the first wireless communication device determines, at block 1012, that the OBSS channel utilization is less than the configured value then, at block 1016, the first wireless communication device may refraining from increasing the OBSS PD threshold.

By increasing the OBSS PD threshold when the OBSS channel utilization is greater than the configured value, the first wireless communication device may increase the likelihood of obtaining a SR opportunity to transmit data to one or more other devices, which may reduce the amount of OBSS channel utilization. By refraining from increasing the OBSS PD threshold when the OBSS channel utilization is less than the configured value, the first wireless communication device may maintain (or, in some instances, decrease) the likelihood of obtaining a SR opportunity, and therefore may maintain its transmit power levels for SR transmissions.

Figure 11A:
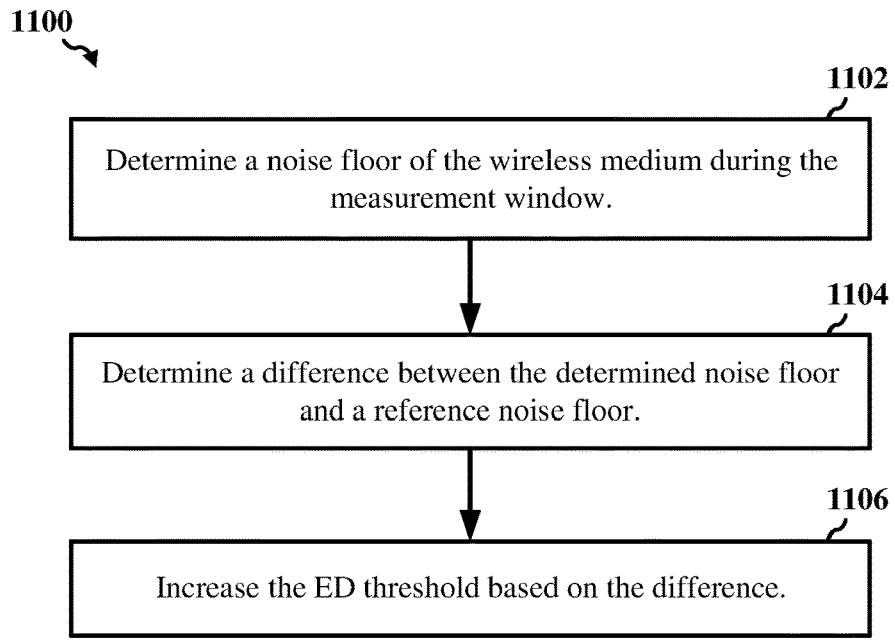
FIG. 11A shows a flowchart illustrating an example process for wireless communication that supports adjusting one or more channel access parameters according to some other implementations.

FIG. 11A shows a flowchart illustrating an example process 1100 for wireless communication that supports adjusting one or more channel access parameters according to some other implementations. The process 1100 may be performed by a first wireless communication device, such as the wireless communication device 500 described above with reference to FIG. 5. In some implementations, the first wireless communication device may operate as or within an AP, such as one of the APs 102 and 602 described above with reference to FIGS. 1 and 6A, respectively. In some other implementations, the first wireless communication device may operate as or within a STA, such as one of the STAs 104 and 604 described above with reference to FIGS. 1 and 6B, respectively.

In some implementations, the process 1100 may be an example implementation of adjusting the ED threshold in block 708 of FIG. 7. At block 1102, the first wireless communication device determines a noise floor of the wireless medium during the measurement window. At block 1104, the first wireless communication device determines a difference between the determined noise floor and a reference noise floor. At block 1106, the first wireless communication device increases the ED threshold based on the difference.

In some implementations, a congested wireless network or a presence of large levels of interference may elevate the noise floor of the wireless medium (such as because of numerous communications transmitted in partially overlapping channels). In some instances, the first wireless communication device may increase the ED threshold when the noise floor has increased by more than a certain amount, for example, such that the elevated noise floor is less likely to generate a CCA busy indication.

Figure 11B:
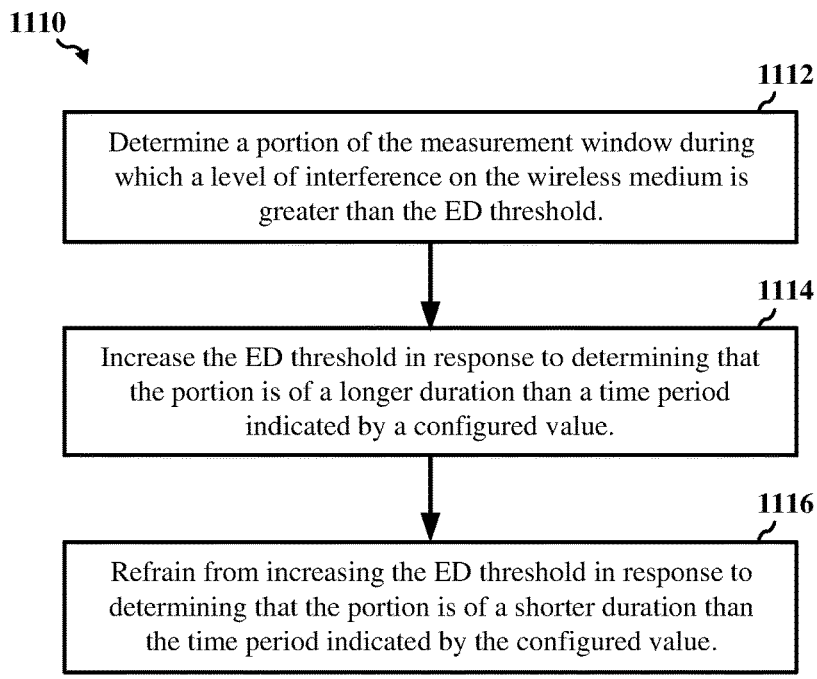
FIG. 11B shows a flowchart illustrating an example process for wireless communication that supports adjusting one or more channel access parameters according to some other implementations.

FIG. 11B shows a flowchart illustrating an example process 1110 for wireless communication that supports adjusting one or more channel access parameters according to some other implementations. The process 1110 may be performed by a first wireless communication device, such as the wireless communication device 500 described above with reference to FIG. 5. In some implementations, the first wireless communication device may operate as or within an AP, such as one of the APs 102 and 602 described above with reference to FIGS. 1 and 6A, respectively. In some other implementations, the first wireless communication device may operate as or within a STA, such as one of the STAs 104 and 604 described above with reference to FIGS. 1 and 6B, respectively.

In some implementations, the process 1110 may be an example implementation of adjusting the ED threshold in block 708 of FIG. 7. For example, at block 1112, the first wireless communication device determines a portion of the measurement window during which a level of interference on the wireless medium is greater than the ED threshold. In some implementations, if the first wireless communication device determines, at block 1112, that the portion of the measurement window during which the level of interference on the wireless medium is greater than the ED threshold is of a longer duration than a time period indicated by a configured value (for example, a preconfigured value or a user-selected value) then, at block 1114, the first wireless communication device may increase the ED threshold. Conversely, if the first wireless communication device determines, at block 1112, that the portion of the measurement window during which the level of interference on the wireless medium is greater than the ED threshold is of a shorter duration than the time period indicated by the configured value then, at block 1116, the first wireless communication device may refrain from increasing the ED threshold.

Figure 12:
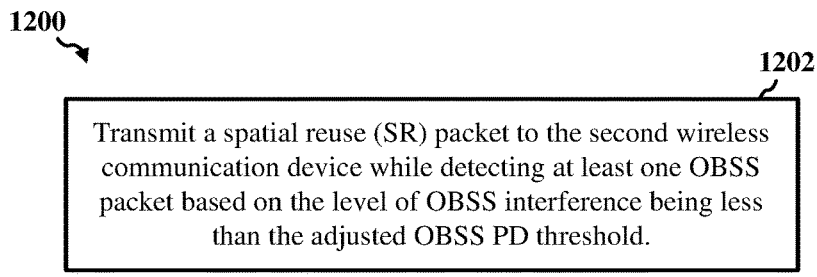
FIG. 12 shows a flowchart illustrating an example process for wireless communication that supports spatial reuse according to some other implementations.

FIG. 12 shows a flowchart illustrating an example process 1200 for wireless communication that supports spatial reuse according to some other implementations. The process 1200 may be performed by a first wireless communication device, such as the wireless communication device 500 described above with reference to FIG. 5. In some implementations, the first wireless communication device may operate as or within an AP, such as one of the APs 102 and 602 described above with reference to FIGS. 1 and 6A, respectively. In some other implementations, the first wireless communication device may operate as or within a STA, such as one of the STAs 104 and 604 described above with reference to FIGS. 1 and 6B, respectively.

In some implementations, the process 1200 may be performed after adjusting one or more of the PD threshold, the OBSS threshold, or the ED threshold in block 708 of FIG. 7. At block 1202, the first wireless communication device transmits a spatial reuse (SR) packet to the second wireless communication device concurrently with detecting at least one OBSS packet based on the level of OBSS interference being less than the adjusted OBSS PD threshold.

In some implementations, the first wireless communication device may, after determining that transmissions detected on the wireless medium are OBSS packets, determine RSSI values for the OBSS packets and compare the determined RSSI values with the adjusted OBSS PD threshold. When the RSSI values of the OBSS packets, which may correspond to the level of OBSS interference, is less than the adjusted OBSS PD threshold, the first wireless communication device may transmit data on the wireless medium using spatial reuse (SR) packets, even though there is another valid transmission on the wireless medium. When the RSSI values of the OBSS packets is greater than the adjusted OBSS PD threshold, the first wireless communication device may defer medium access.

In many wireless networks, a wireless communication device may adjust its own OBSS PD threshold when performing a CCA to determine whether the wireless medium is busy or idle. For example, the wireless communication device may increase its OBSS PD threshold to increase the likelihood of obtaining SR opportunities, for example, by determining that the wireless medium is idle when other wireless communication devices using lower OBSS PD thresholds determine that the wireless medium is busy. To minimize interference caused by SR packets, among others, the IEEE 802.11 family of wireless communication protocol standards specifies that when a wireless device adjusts its own OBSS PD threshold when performing a CCA on a wireless medium, the wireless device must also adjust its transmit power. Specifically, when a wireless device increases its own OBSS PD threshold, the wireless device must decrease the power level at which the corresponding SR packets are transmitted on the wireless medium. As a result, various aspects of the present disclosure may balance the increased likelihood of SR opportunities resulting from a higher OBSS PD threshold with the lower transmit power of the SR packets.

Figure 13:
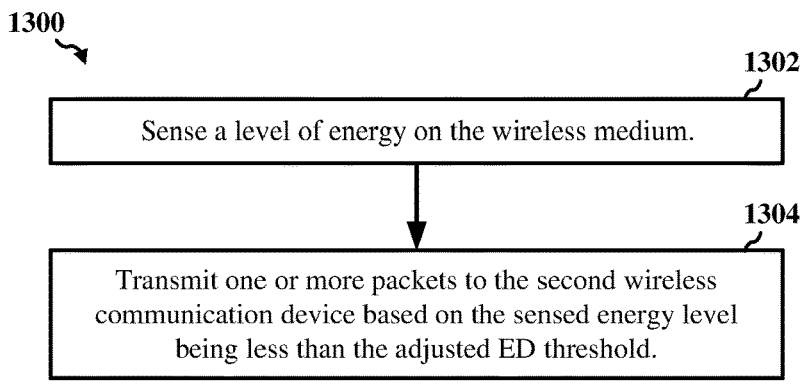
FIG. 13 shows a flowchart illustrating an example process for wireless communication that supports adjusting one or more channel access parameters according to some other implementations.

FIG. 13 shows a flowchart illustrating an example process 1300 for wireless communication that supports adjusting one or more channel access parameters according to some other implementations. The process 1300 may be performed by a first wireless communication device, such as the wireless communication device 500 described above with reference to FIG. 5. In some implementations, the first wireless communication device may operate as or within an AP, such as one of the APs 102 and 602 described above with reference to FIGS. 1 and 6A, respectively. In some other implementations, the first wireless communication device may operate as or within a STA, such as one of the STAs 104 and 604 described above with reference to FIGS. 1 and 6B, respectively.

In some implementations, the process 1300 may be performed after adjusting one or more of the PD threshold, the OBSS threshold, or the ED threshold in block 708 of FIG. 7. At block 1302, the first wireless communication device senses a level of energy on the wireless medium. At block 1304, the first wireless communication device transmits one or more packets to the second wireless communication device based on the sensed energy level being less than the adjusted ED threshold.

Figure 14:
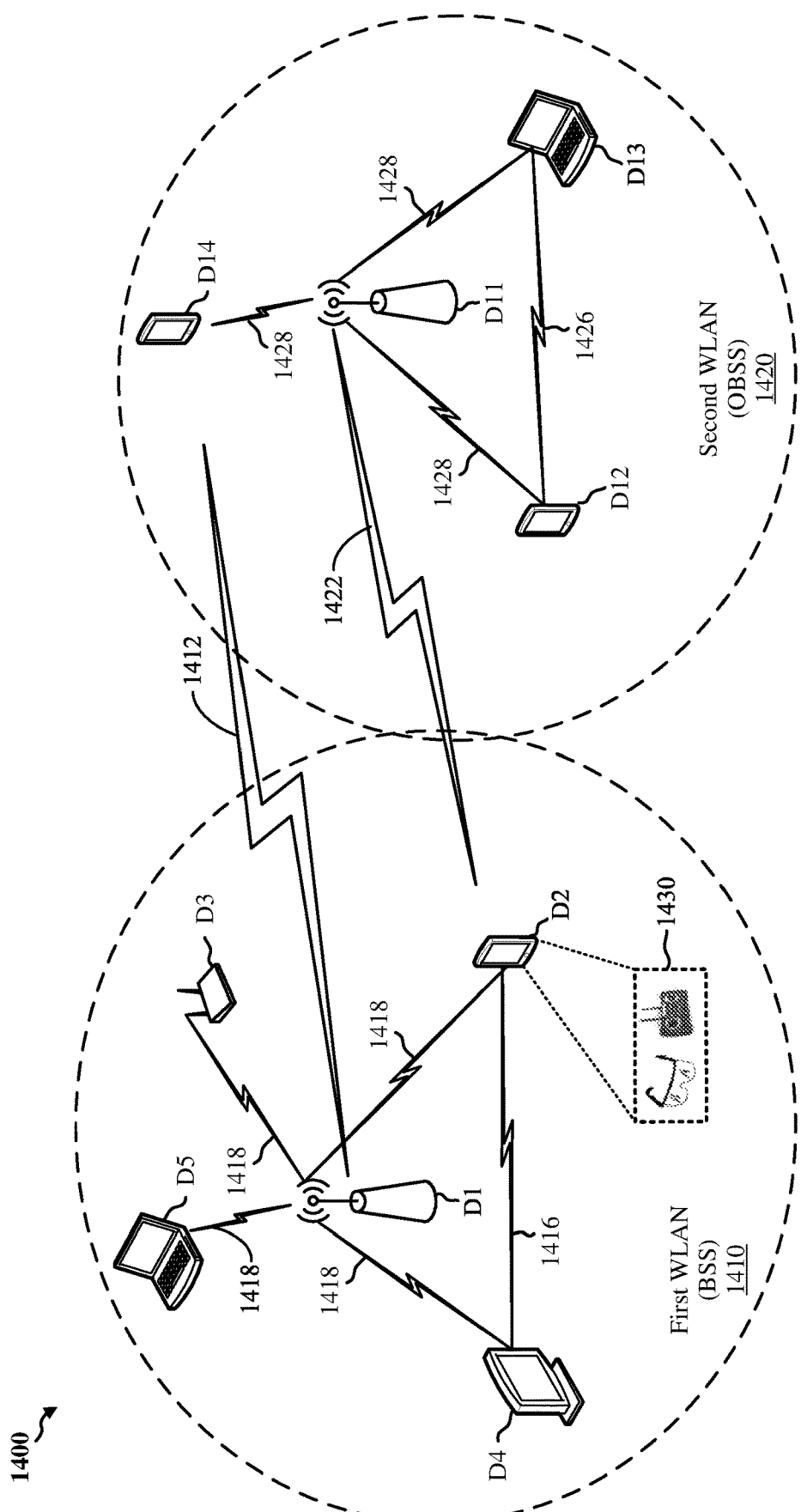
FIG. 14 shows a pictorial diagram of an example wireless communication environment according to some implementations.

FIG. 14 shows a pictorial diagram of an example wireless communication environment 1400 according to some implementations. The wireless communication environment 1400 may include a first wireless communication network 1410 and a second wireless communication network 1420. In some implementations, the first wireless communication network 1410 can be an example of a WLAN, such as a Wi-Fi network (and will hereinafter be referred to as WLAN 1410). For example, the WLAN 1410 can be a network implementing at least one of the IEEE 802.11 family of wireless communication protocol standards, and may include numerous wireless communication devices D1-D5 that can operate as access points (APs) or wireless stations (STAs). As shown in the example of FIG. 14, the WLAN 1410 may be or correspond to a basic service set (BSS), device D1 may operate as an AP that manages the BSS, and devices D2-D5 may operate as client devices that belong to the BSS. Devices D2-D5 may communicate with device D1 (operating as the AP) via communication links 1416, and may communicate with one another via communication links 1418 (only one communication link 1418 shown for simplicity).

In some implementations, the second wireless communication network 1420 can also be an example of a WLAN, such as a Wi-Fi network (and will hereinafter be referred to as WLAN 1420). For example, the WLAN 1420 can be a network implementing at least one of the IEEE 802.11 family of wireless communication protocol standards, and may include numerous wireless communication devices D11-D14 that can operate as APs or STAs. As shown in the example of FIG. 14, the WLAN 1420 may be or correspond to an overlapping basic service set (OBSS), device D11 may operate as an AP that manages the OBSS, and devices D12-D14 may operate as client devices that belong to the OBSS. Devices D12-D14 may communicate with device D11 (operating as the AP) via communication links 1426, and may communicate with one another via communication links 1428 (only one communication link 1428 shown for simplicity).

In some implementations, the wireless communication environment 1400 may be a stationary environment (such as a home or office), the first WLAN 1410 may be used for high-priority traffic, and the second WLAN 1420 may be a neighboring wireless network. In some instances, device D2 may be a headset or controller 1430 usable for gaming applications, AR applications, VR applications, or any combination thereof, and device D1 may provide one or more communication channels for applications executing on device D2. In some other implementations, the wireless communication environment 1400 may be associated with a vehicle, the first WLAN 1410 may be used for high-priority traffic by occupants of the vehicle, and the second WLAN 1420 may be a neighboring wireless network (such as a Wi-Fi hotspot near the vehicle). In some instances, device D2 may be a smartphone usable for streaming applications (such as music, video, or calls) to a vehicle infotainment system, and device D1 may provide one or more communication channels for the streaming applications executing on device D2.

The first WLAN 1410 and the second WLAN 1420 may be sufficiently proximate to one another such that communications transmitted from devices D11-D14 of the second WLAN 1420 can interfere with communications of the devices D1-D5 of the first WLAN 1410. For example, communications 1422 transmitted from device D11 and intended for other devices D12-D14 of the second WLAN 1420 may be received, or at least detected, by one or more devices D1-D5 of the first WLAN 1410. As such, the second WLAN 1420 may be considered as an OBSS to the first WLAN 1410, and communications transmitted from wireless devices belonging to the second WLAN 1420 may be considered as OSBB interference. Similarly, communications transmitted from devices D1-D5 of the first WLAN 1410 can interfere with communications involving the devices D11-D14 of the second WLAN 1420. For example, communications 1412 transmitted from device D1 and intended for other devices D2-D5 of the first WLAN 1410 may be received, or at least detected, by one or more devices D11-D14 of the second WLAN 1420.

In some implementations, one or more of the devices D1-D5 associated with the first WLAN 1410 may adjust one or more parameters of a random channel access mechanism based on intra-BSS interference and inter-BSS interference when performing a CCA on the wireless medium, or otherwise contending for medium access, to transmit or receive high-priority data. The intra-BSS interference may refer to energy detected on the wireless medium resulting from communications transmitted by wireless communication devices associated with the first WLAN 1410, and the inter-BSS interference may refer to energy detected on the wireless medium resulting from communications transmitted by wireless communication devices belonging to the second WLAN 1420. The inter-BSS interference may also be referred to herein as OBSS interference. In addition, or in the alternative, the one or more random channel access parameters may be further based on at least one performance metric of the wireless link or channel upon which communications are exchanged between wireless communication devices belonging to the first WLAN 1410. In some instances, the at least one performance metric may include one or more of a PER, a channel condition, a number of ACK timeouts, a throughput loss, or an effective data rate of the transmission of the plurality of packets from the second wireless communication device.

In some implementations, the random channel access mechanism may be an EDCA mechanism, and the one or more parameters may include a PD threshold, an OBSS threshold, and an ED threshold. In some instances, one or more of the devices D1-D5 of the first WLAN 1410 may determine an amount by which to adjust one or more of the PD threshold, the OBSS threshold, or the ED threshold during a measurement window, and may use one or more of the adjusted PD threshold, the adjusted OBSS threshold, or the adjusted ED threshold when performing a CCA on the wireless medium, such as part of a medium access contention operation, as described with reference to FIG. 16.

In general, the PD threshold may be used to determine whether the wireless medium is busy responsive to detecting a decodable frame or packet (for example, an intra-BSS packet) on the wireless medium. The OBSS PD threshold may be used to determine whether the wireless medium is busy or whether a spatial reuse (SR) opportunity is available responsive to detecting a decodable OBSS frame or packet on the wireless medium. The ED threshold may be used to determine whether the wireless medium is busy responsive to detecting energy on the wireless medium regardless of whether the wireless communication device can decode any preambles associated with the detected energy. Typically, the ED threshold corresponds to the highest threshold value, the PD threshold corresponds to the lowest threshold value, and the OBSS PD threshold has a value between the ED threshold and the PD threshold. For example, at least one of the IEEE 802.11 family of wireless communication protocol standards may set the ED threshold to a relatively high RSSI value, may set the PD threshold to a relatively low RSSI value, and may set the OBSS PD threshold to an RSSI value between the relatively high RSSI value of the ED threshold and the relatively low RSSI value of the PD threshold.

In general, a spatial reuse (SR) opportunity may allow a first wireless communication device belonging to the first BSS to transmit data on the wireless medium during a TXOP obtained by another wireless communication device belonging to the OBSS, even while the other wireless communication device is transmitting OBSS packets. Specifically, the first wireless communication device may transmit data on the wireless medium in the presence of OBSS interference when the level of OBSS interference is not greater than the OBSS PD threshold.

Figure 15:
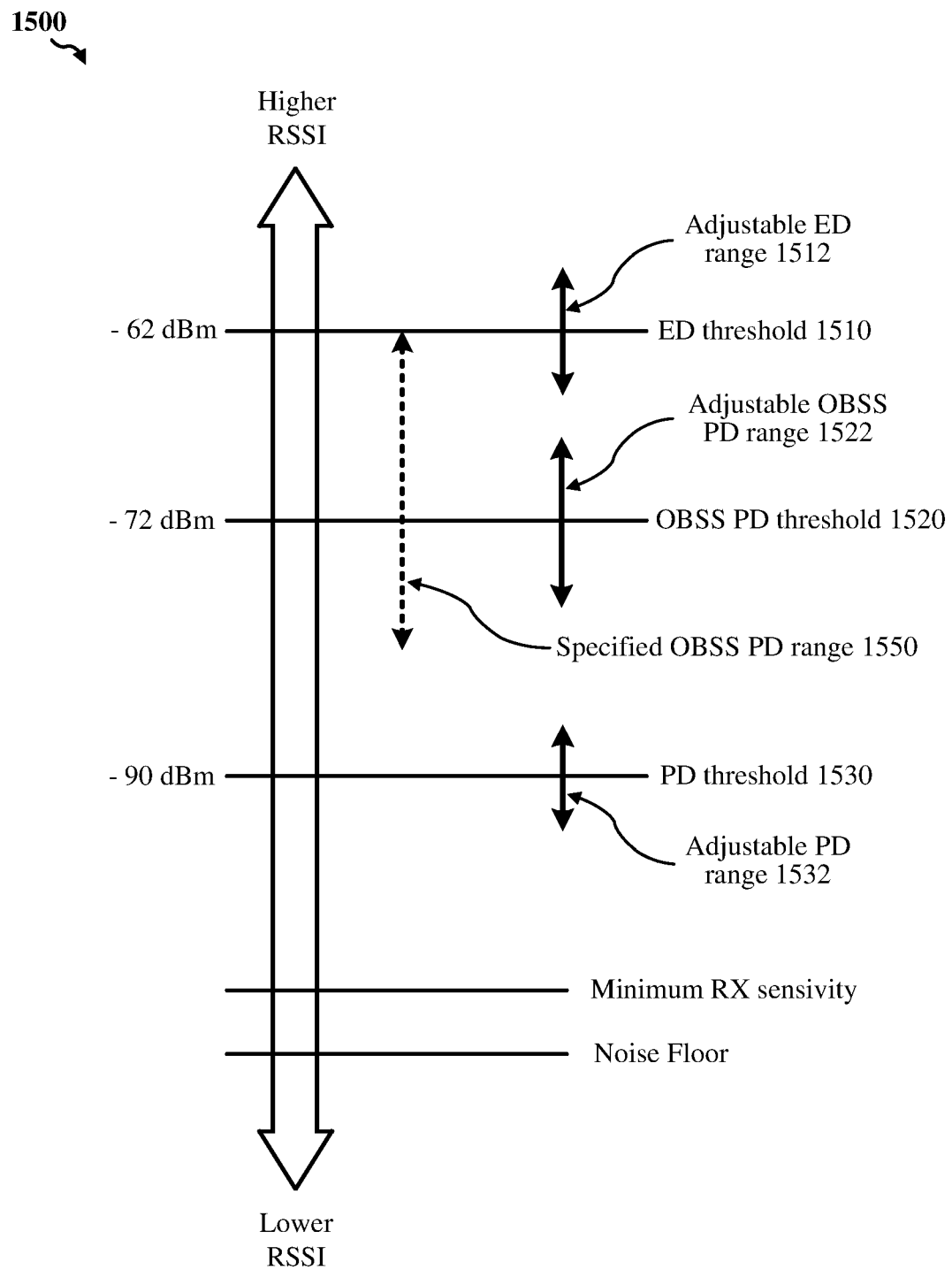
FIG. 15 shows an illustration of energy thresholds usable for random channel access mechanisms according to some implementations.

FIG. 15 shows an illustration 1500 of multiple thresholds usable for random channel access mechanisms according to some implementations. The illustration 1500 depicts an ED threshold 1510, an OBSS PD threshold 1520, and a PD threshold 1530. In the example illustration 1500, the ED threshold 1510 is set to a relatively high RSSI value of approximately −62 dBm, the PD threshold 1530 is set to a relatively low RSSI value of approximately −90 dBm, and the OBSS PD threshold 1520 is set to an RSSI value of approximately −72 dBm. In some implementations, a wireless communication device implementing one or more aspects of the present disclosure may adjust the PD threshold 1510 within a first range 1512 of RSSI values, may adjust the OBSS PD threshold 1520 within a second range 1522 of RSSI values, and may adjust the ED threshold 1530 within a third 1532 of RSSI values.

In some instances, the adjustable OBSS PD threshold range 1522 used by wireless communication devices that implement one or more aspects of the present disclosure may be smaller than the range 1550 of OBSS PD threshold values specified by one or more of the IEEE 802.11 family of wireless communication protocol standards. In addition, or in the alternative, the adjustable OBSS PD threshold range 1522 used by wireless communication devices that implement one or more aspects of the present disclosure may extend approximately 5 dBm above and below the OBSS PD threshold 1520, and may be significantly smaller (such as by 5 dBm or more) than the specified OBSS PD threshold range 1550.

Figure 16:
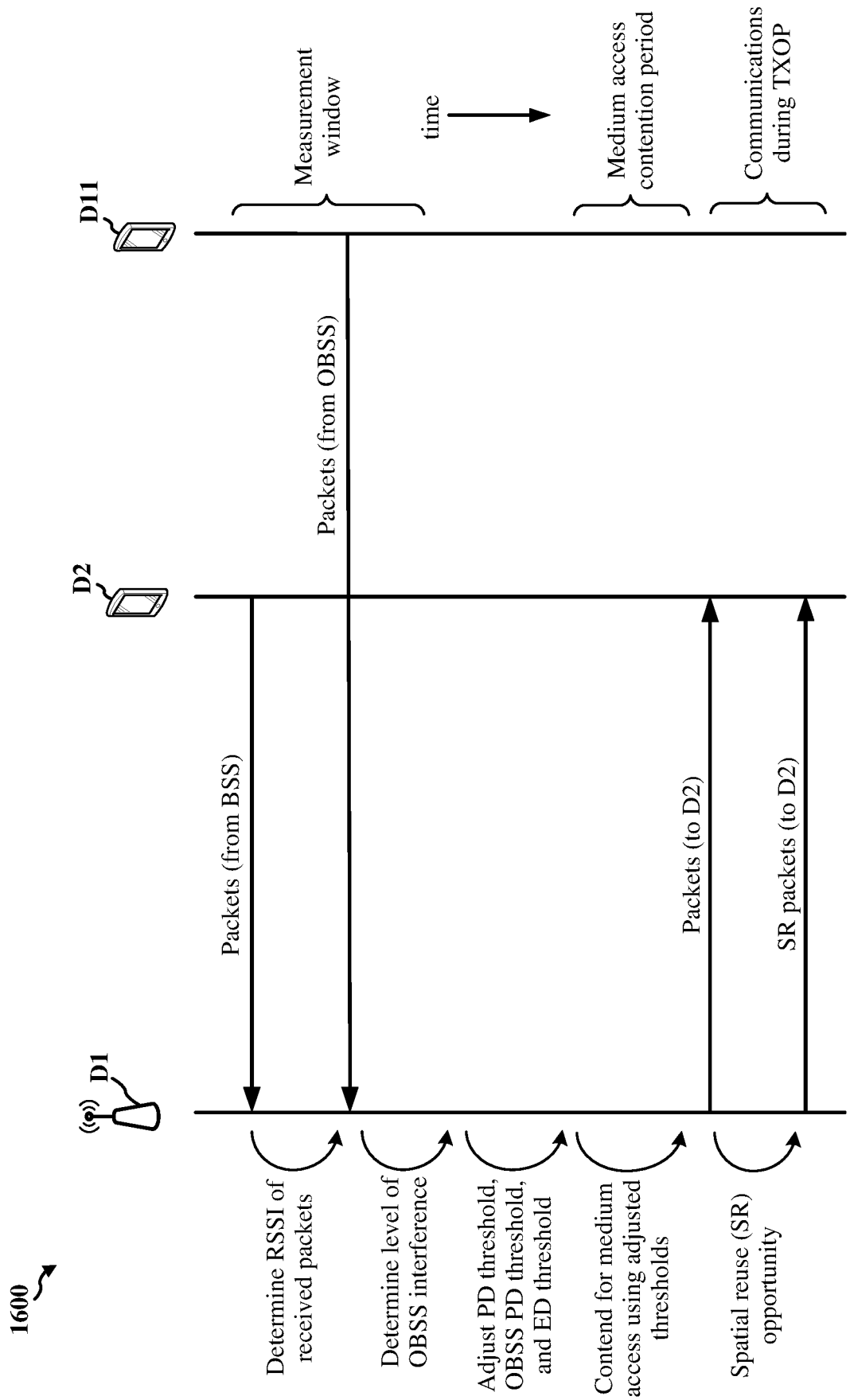
FIG. 16 shows a sequence diagram illustrating the transmissions of communications according to some implementations.

FIG. 16 shows a sequence diagram 1600 illustrating the transmissions of communications between devices D1, D2, and D11 of the example wireless communication environment 1400 of FIG. 14. Each of the devices D1, D2, and D11 may be any suitable wireless communication device such as one of the APs 102 and 602 described above with reference to FIGS. 1 and 6A, respectively, or one of the STAs 104 and 604 described above with reference to FIGS. 1 and 6B, respectively.

With reference also to FIG. 14, device D1 may receive a plurality of packets from device D2 on one or more links of a wireless medium during a measurement window, and may determine an RSSI value of the plurality of packets received during the measurement window. In some implementations, the one or more links may correspond to links 1418 of the first WLAN 1410 of FIG. 14. In some instances, device D1 may determine an RSSI value for each packet received from device D2, and may combine the determined RSSI values (such as by averaging) to generate the RSSI value of the plurality of packets received from device D2. In some other instances, the determined RSSI value may otherwise generally indicate a level of intra-BSS interference on the wireless medium.

In some implementations, device D1 may also determine a level of OBSS interference on the wireless medium during the measurement window. The level of OBSS interference may be associated with the transmission of one or more packets from the second WLAN 1420. In some instances, device D1 may receive or decode at least a portion of the preambles of the one or more packets, identify the one or more packets as OBSS packets based on information carried in the preambles, and determine an RSSI value of the one or more OBSS packets. In some other instances, the determined RSSI value of the one or more OBSS packets may otherwise generally indicate the level of OBSS interference on the wireless medium.

Device D1 may adjust one or more of the PD threshold, the OBSS PD threshold, or the ED threshold based on the level of OBSS interference and the determined RSSI value of the packets received from device D2. When device D1 has data to transmit or receive, device D1 may contend for medium access using one or more of the adjusted PD threshold, the adjusted OBSS PD threshold, or the adjusted ED threshold (rather than using the originally specified PD threshold, OBSS PD threshold, and ED threshold, respectively). In some implementations, device D1 may contend with one or more other wireless devices (not shown for simplicity) for medium access using the EDCA mechanism. For example, device D1 may randomly select or generate a backoff number based on a CW, may initialize its backoff counter based on the randomly selected backoff number, and may decrement its backoff counter by one slot each time device D1 determines that the wireless medium is continuously idle for DIFS period (or other suitable IFS period). When the backoff counter reaches zero, device D1 may become the owner of a TXOP and transmit or receive data on the wireless medium for a duration of the TXOP.

Device D1 may determine whether the wireless medium is idle by sensing a level of energy on the wireless medium, and comparing the sensed energy level to one or more of the adjusted PD threshold, the adjusted OBSS PD threshold, or the adjusted ED threshold. In some implementations, device D1 may detect the preambles of the packets received from device D2 during the measurement window, determine that the packets were transmitted from device D2, and compare the determined RSSI value of the received packets with the adjusted PD threshold. For example, if the determined RSSI value is greater than the adjusted PD threshold, the CCA may indicate that the wireless medium is busy, and device D1 may defer channel access. Conversely, if the determined RSSI value is not greater than the adjusted PD threshold, the CCA may indicate that the wireless medium is idle. When the wireless medium is determined to be idle for the appropriate IFS period, device D1 may decrement its backoff counter, and gain access to the wireless medium for a TXOP when the backoff counter reaches zero.

In some implementations, device D1 may detect the preambles of packets received from the second WLAN 1420 during the measurement window, determine that the packets are transmitted from an OBSS, and compare the determined RSSI value of the OBSS packets with the adjusted OBSS PD threshold to determine whether a spatial reuse opportunity is available. For example, if the determined RSSI value is greater than the adjusted OBSS PD threshold, the CCA may indicate that the wireless medium is busy, and device D1 may defer channel access. Conversely, if the determined RSSI value is not greater than the adjusted OBSS PD threshold, the CCA may indicate that the wireless medium is idle, and device D1 may gain medium access and transmit data to one or more other wireless devices using SR packets.

If device D1 is not able to decode the preamble of packets associated with the detected interference on the wireless medium, device D1 may use the ED threshold to determine whether the medium is busy. In some implementations, device D1 may measure the total energy on the wireless medium, and compare the total energy on the wireless medium with the ED threshold. For example, if the measured energy is greater than the adjusted ED threshold, the CCA may indicate that the wireless medium is busy, and device D1 may defer channel access. Conversely, if the measured energy is not greater than the adjusted ED threshold, the CCA may indicate that the wireless medium is idle, and device D1 may continue with gaining access to the wireless medium.

Figure 17:
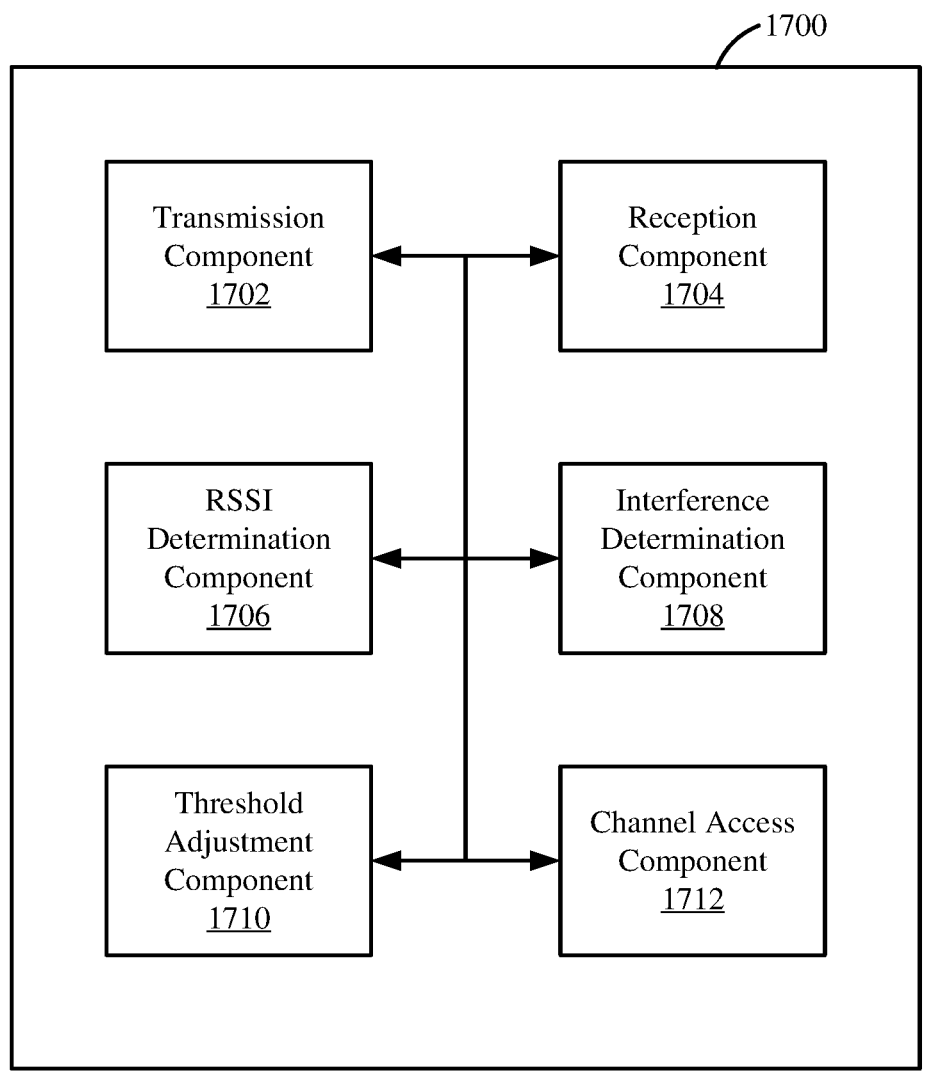
FIG. 17 shows a block diagram of an example wireless communication device that supports adjusting one or more channel access parameters according to some other implementations.

FIG. 17 shows a block diagram of an example wireless communication device 1700 that supports adjusting one or more channel access parameters according to some implementations. In some implementations, the wireless communication device 1700 is configured to perform one or more of the processes 700, 800, 900, 910, 1000, 1010, 1100, 1110, 1200, and 1300 described above with reference to FIGS. 7, 8, 9A, 9B, 10A, 10B, 11A, 11B, 12, and 13, respectively. The wireless communication device 1700 may be an example implementation of the wireless communication device 500 described above with reference to FIG. 5. For example, the wireless communication device 1700 can be a chip, SoC, chipset, package or device that includes at least one processor (such as the processor 502), at least one modem (for example, a Wi-Fi (IEEE 802.11) modem or a cellular modem such as the modem 504), at least one memory (such as the memory 508), and at least one radio (such as the radio 506). In some implementations, the wireless communication device 1700 can be a device for use in a STA, such as one of the STAs 104 and 604 described above with reference to FIGS. 1 and 6B, respectively. In some other implementations, the wireless communication device 1700 can be a STA that includes such a chip, SoC, chipset, package or device as well as at least one antenna (such as the antennas 625).

The wireless communication device 1700 includes a transmission component 1702, a reception component 1704, an RSSI determination component 1706, an interference determination component 1708, a threshold adjustment component 1710, and a channel access component 1712. Portions of one or more of the components 1702, 1704, 1706, 1708, 1710, and 1712 may be implemented at least in part in hardware or firmware. For example, the transmission component 1702, the reception component 1704, and the channel access component 1712 may be implemented at least in part by a modem (such as the modem 502). In some implementations, at least some of the components 1702, 1704, 1706, 1708, 1710, and 1712 are implemented at least in part as software stored in a memory (such as the memory 508). For example, portions of one or more of the components 1702, 1704, 1706, 1708, 1710, and 1712 can be implemented as non-transitory instructions (or "code") executable by a processor (such as the processor 506) to perform the functions or operations of the respective module.

The transmission component 1702 is configured to transmit frames or packets to one or more other wireless communication devices on a wireless medium. In some implementations, the transmission component 1702 may transmit spatial reuse (SR) packets to one or more other wireless communication devices while detecting at least one OBSS packet during an SR opportunity.

The reception component 1704 is configured to receive frames or packets from one or more other wireless communication devices on the wireless medium. In some implementations, the reception component 1704 receives a plurality of packets transmitted during a measurement window by another wireless communication device associated with the same BSS. The reception component 1704 may also receive one or more packets transmitted during the measurement window by another wireless communication device associated with an OBSS.

The RSSI determination component 1706 is configured to determine RSSI values of packets received or at least detected on the wireless medium. In some implementations, the RSSI determination component 1706 determines RSSI values of a plurality of packets transmitted during a measurement window by another wireless communication device associated with the same BSS.

The interference determination component 1708 is configured to determine one or more levels of interference on the wireless medium. In some implementations, the interference determination component 1708 determines a level of OBSS interference on the wireless medium during the measurement window.

The threshold adjustment component 1710 is configured to adjust one or more channel access parameters based on the determined RSSI value and the level of OBSS interference. In some implementations, the threshold adjustment component 1710 adjusts one or more of a packet detect (PD) threshold, an OBSS PD threshold, or an energy detect (ED) threshold based on the determined RSSI value and the level of OBSS interference.

The channel access component 1712 is configured to contend for medium access using one or more of the adjusted channel access parameters. In some implementations, the channel access component 1712 contends for medium access using one or more of the adjusted PD threshold, the adjusted OBSS PD threshold, or the adjusted ED threshold.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a first wireless communication device associated with a basic service set (BSS), comprising:
    receiving, on one or more links of a wireless medium, a plurality of packets transmitted during a measurement window by a second wireless communication device associated with the BSS;
    determining a received signal strength indicator (RSSI) value of the plurality of packets received from the second wireless communication device during the measurement window;
    determining a level of overlapping basic service set (OBSS) interference on the wireless medium during the measurement window; and
    adjusting one or more of a packet detect (PD) threshold, an OBSS PD threshold, or an energy detect (ED) threshold based on the determined RSSI value and the level of OBSS interference.

2. The method of claim 1, wherein the adjusting comprises adjusting the PD threshold, the method further comprising:
    performing a clear channel assessment (CCA) on the wireless medium using the adjusted PD threshold;
    gaining access to the wireless medium for a transmit opportunity (TXOP) based on the CCA; and
    transmitting one or more packets to the second wireless communication device during the TXOP.

3. The method of claim 2, wherein the adjusting of the PD threshold comprises adjusting the PD threshold to increase a margin between the adjusted PD threshold and the determined RSSI value concurrently with maintaining the adjusted PD threshold higher than the level of OBSS interference.

4. The method of claim 1, wherein the adjusting of the PD threshold comprises:
    determining a portion of the measurement window during which a channel utilization of OBSS traffic is greater than a first configured value; and
    increasing the PD threshold in response to determining that the portion is of a longer duration than a time period indicated by a second configured value; and
    refraining from increasing the PD threshold in response to determining that the portion is of a shorter duration than the time period indicated by the second configured value.

5. The method of claim 4, wherein the channel utilization of the OBSS traffic is based at least in part on the level of OBSS interference.

6. The method of claim 4, wherein the OBSS interference is associated with a plurality of OBSS packets, and determining the portion includes identifying each OBSS packet of the plurality of OBSS packets based on information contained in a signaling field of the respective OBSS packet.

7. The method of claim 6, wherein the information includes one or more of a length or duration value indicated in a legacy signaling field (L-SIG) of the respective OBSS packet, a transmit opportunity (TXOP) duration indicated in a non-legacy signaling field of the respective OBSS packet, or a duration/ID value in a medium access control (MAC) header of the respective OBSS packet.

8. The method of claim 1, wherein the adjusting of the OBSS PD threshold comprises:
   determining one or more performance metrics for the one or more links on which the plurality of packets are received from the second wireless communication device; and
   increasing the OBSS PD threshold in response to determining that the one or more determined performance metrics are greater than a configured value; and
   maintaining or decreasing the OBSS PD threshold in response to determining that the one or more determined performance metrics are less than the configured value.

9. The method of claim 8, wherein the performance metrics include one or more of a packet error rate (PER), channel conditions, a number of acknowledgement (ACK) timeouts, a throughput loss, or an effective data rate of the transmission of the plurality of packets from the second wireless communication device.

10. The method of claim 8, wherein the OBSS PD threshold is adjusted to increase the performance metrics concurrently with increasing the number of spatial reuse (SR) transmission opportunities available to the first wireless communication device.

11. The method of claim 1, wherein the adjusting of the OBSS PD threshold comprises:
   determining a channel utilization of OBSS traffic associated with the OBSS interference; and
   increasing the OBSS PD threshold in response to determining that the OBSS channel utilization is greater than a configured value; and
   refraining from increasing the OBSS PD threshold in response to determining that the OBSS channel utilization is less than the configured value.

12. The method of claim 1, further comprising:
   transmitting a spatial reuse (SR) packet to the second wireless communication device concurrently with detecting at least one OBSS packet based on the level of OBSS interference being less than the adjusted OBSS PD threshold.

13. The method of claim 1, wherein the adjusting of the ED threshold comprises:
   determining a noise floor of the wireless medium during the measurement window;
   determining a difference between the determined noise floor and a reference noise floor; and
   increasing the ED threshold based on the difference.

14. The method of claim 1, wherein the adjusting of the ED threshold comprises:
   determining a portion of the measurement window during which a level of interference on the wireless medium is greater than the ED threshold; and
   increasing the ED threshold in response to determining that the portion is of a longer duration than a time period indicated by a configured value; and
   refraining from increasing the ED threshold in response to determining that the portion is of a shorter duration than the time period indicated by the configured value.

15. The method of claim 1, further comprising:
   sensing a level of energy on the wireless medium; and
   transmitting one or more packets to the second wireless communication device based on the sensed energy level being less than the adjusted ED threshold.

16. A first wireless communication device associated with a basic service set (BSS), comprising:
   at least one modem;
   at least one processor communicatively coupled with the at least one modem; and
   at least one memory communicatively coupled with the at least one processor and storing processor-readable code that, when executed by the at least one processor in conjunction with the at least one modem, is configured to:
      receive, on one or more links of a wireless medium, a plurality of packets transmitted during a measurement window by a second wireless communication device associated with the BSS;
      determine a received signal strength indicator (RSSI) value of the plurality of packets received from the second wireless communication device during the measurement window;
      determine a level of overlapping basic service set (OBSS) interference on the wireless medium during the measurement window; and
      adjust one or more of a packet detect (PD) threshold, an OBSS PD threshold, or an energy detect (ED) threshold based on the determined RSSI value and the level of OBSS interference.

17. The first wireless communication device of claim 16, wherein the adjusting of comprises adjusting the PD threshold, and wherein execution of the processor-readable code by the at least one processor in conjunction with the at least one modem is further configured to:
   perform a clear channel assessment (CCA) on the wireless medium using the adjusted PD threshold;
   gain access to the wireless medium for a transmit opportunity (TXOP) based on the CCA; and
   transmit one or more packets to the second wireless communication device during the TXOP.

18. The first wireless communication device of claim 17, wherein the adjusting of the PD threshold comprises adjusting the PD threshold to increase a margin between the adjusted PD threshold and the determined RSSI value concurrently with maintaining the adjusted PD threshold higher than the level of OBSS interference.

19. The first wireless communication device of claim 16, wherein execution of the processor-readable code by the at least one processor in conjunction with the at least one modem is configured to adjust the PD threshold by:
   determining a portion of the measurement window during which a channel utilization of OBSS traffic is greater than a first configured value; and
   increasing the PD threshold in response to determining that the portion is of a longer duration than a time period indicated by a second configured value; and
   refraining from increasing the PD threshold in response to determining that the portion is of a shorter duration than the time period indicated by the second configured value.

20. The first wireless communication device of claim 19, wherein the channel utilization of the OBSS traffic is based at least in part on the level of OBSS interference.

21. The first wireless communication device of claim 20, wherein the OBSS traffic comprises a plurality of OBSS packets, and determining the channel utilization of the OBSS traffic includes identifying each OBSS packet of the plurality of OBSS packets based on information contained in a signaling field of the respective OBSS packet.

22. The first wireless communication device of claim 21, wherein the information includes one or more of a length or duration value indicated in a legacy signaling field (L-SIG) of the respective OBSS packet, a transmit opportunity (TXOP) duration indicated in a non-legacy signaling field of the respective OBSS packet, or a duration/ID value in a medium access control (MAC) header of the respective OBSS packet.

23. The first wireless communication device of claim 16, wherein execution of the processor-readable code by the at least one processor in conjunction with the at least one modem is configured to adjust the OBSS PD threshold by:
   determining one or more performance metrics for the one or more links on which the plurality of packets are received from the second wireless communication device; and
   increasing the OBSS PD threshold in response to determining that the one or more determined performance metrics are greater than a configured value; and
   maintaining or decreasing the OBSS PD threshold in response to determining that the one or more determined performance metrics are less than the configured value.

24. The first wireless communication device of claim 23, wherein the performance metrics include one or more of a packet error rate (PER), channel conditions, a number of acknowledgement (ACK) timeouts, a throughput loss, or an effective data rate of the transmission of the plurality of packets from the second wireless communication device.

25. The first wireless communication device of claim 23, wherein the OBSS PD threshold is adjusted to increase the performance metrics concurrently with increasing a number of spatial reuse (SR) transmission opportunities available to the first wireless communication device.

26. The first wireless communication device of claim 16, wherein execution of the processor-readable code by the at least one processor in conjunction with the at least one modem is configured to adjust the OBSS PD threshold by:
   determining a channel utilization of OBSS traffic associated with the OBSS interference; and
   increasing the OBSS PD threshold in response to determining that the OBSS channel utilization is greater than a configured value; and
   refraining from increasing the OBSS PD threshold in response to determining that the OBSS channel utilization is less than the configured value.

27. The first wireless communication device of claim 16, wherein execution of the processor-readable code by the at least one processor in conjunction with the at least one modem is further configured to:
   transmit a spatial reuse (SR) packet to the second wireless communication device concurrently with detecting at least one OBSS packet based on the level of OBSS interference being less than the adjusted OBSS PD threshold.

28. The first wireless communication device of claim 16, wherein execution of the processor-readable code by the at least one processor in conjunction with the at least one modem is configured to adjust the ED threshold by:
   determining a noise floor of the wireless medium during the measurement window; and
   determining a difference between the determined noise floor and a reference noise floor; and
   increasing the ED threshold based on the difference.

29. The first wireless communication device of claim 16, wherein execution of the processor-readable code by the at least one processor in conjunction with the at least one modem is configured to adjust the ED threshold by:
   determining a portion of the measurement window during which a level of interference on the wireless medium is greater than the ED threshold; and
   increasing the ED threshold in response to determining that the portion is of a longer duration than a time period indicated by a configured value; and
   refraining from increasing the ED threshold in response to determining that the portion is of a shorter duration than the time period indicated by the configured value.

30. The first wireless communication device of claim 16, wherein execution of the processor-readable code by the at least one processor in conjunction with the at least one modem is further configured to:
   sense a level of energy on the wireless medium; and
   transmit one or more packets to the second wireless communication device based on the sensed energy level being less than the adjusted ED threshold.

\* \* \* \* \*